(12) United States Patent
Tognola

(10) Patent No.: US 8,089,349 B2
(45) Date of Patent: Jan. 3, 2012

(54) SIGNAL PROCESS AND SYSTEM

(76) Inventor: Diego Giuseppe Tognola, Windsor (AU)

( * ) Notice: Subject to any disclaimer, the term of this patent is extended or adjusted under 35 U.S.C. 154(b) by 781 days.

(21) Appl. No.: 11/996,283

(22) PCT Filed: Jul. 18, 2006

(86) PCT No.: PCT/AU2006/001015
§ 371 (c)(1),
(2), (4) Date: Aug. 25, 2008

(87) PCT Pub. No.: WO2007/009177
PCT Pub. Date: Jan. 25, 2007

(65) Prior Publication Data
US 2009/0315889 A1    Dec. 24, 2009

(30) Foreign Application Priority Data
Jul. 18, 2005    (AU) ................................ 2005903807

(51) Int. Cl.
*G06T 11/20* (2006.01)
(52) U.S. Cl. ....................................................... 340/440
(58) Field of Classification Search .................... 345/440
See application file for complete search history.

(56) References Cited

U.S. PATENT DOCUMENTS

| | | | |
|---|---|---|---|
| 3,638,066 A | | 1/1972 | Paine et al. |
| 4,562,540 A * | | 12/1985 | Devaney .......................... 700/90 |
| 5,095,207 A * | | 3/1992 | Tong ................................ 850/63 |
| 5,830,150 A | | 11/1998 | Palmer et al. |
| 6,409,659 B1 | | 6/2002 | Warner et al. |
| 6,491,629 B1 * | | 12/2002 | Bousseljot et al. ............ 600/300 |
| 6,587,212 B1 * | | 7/2003 | Barber et al. .................. 356/502 |
| 6,687,665 B1 * | | 2/2004 | Oda et al. ....................... 704/207 |
| 6,741,887 B1 * | | 5/2004 | Gleeson ......................... 600/523 |
| 6,967,652 B1 * | | 11/2005 | Nubling et al. ................ 345/440 |
| 2002/0143245 A1 * | | 10/2002 | Rather et al. ................... 600/407 |
| 2004/0058643 A1 * | | 3/2004 | Martin et al. .................. 455/3.02 |
| 2004/0220801 A1 * | | 11/2004 | Sato ................................ 704/207 |
| 2006/0186882 A1 * | | 8/2006 | Walsh ............................ 324/309 |

FOREIGN PATENT DOCUMENTS
EP    1102240 A1    5/2001
(Continued)

OTHER PUBLICATIONS

Ultrasonic Reflectivity Imaging in Three Dimensions: Exact Inverse Scattering Solutions for Plane, Cylindrical, and Spherical Apertures Norton, Stephen J.; Linzer, Melvin; Biomedical Engineering, IEEE Transactions on vol. BME-28 , Issue: 2 Digital Object Identifier: 10.1109/TBME.1981.324791 Publication Year: 1981 , pp. 202-220.*

(Continued)

*Primary Examiner* — Javid Amini
(74) *Attorney, Agent, or Firm* — Seed IP Law Group PLLC

(57) ABSTRACT

A signal process, including processing signal data representing a signal to determine cycles of the signal, the cycles having different lengths; and processing the signal data to generate normalization data for normalizing the cycles to a common length. The process generates cycle data representing alignment of a plurality of normalized cycles of the signal. The cycle data can be displayed to a user to provide a visual representation of the signal that is readily understood by non-expert users. The displayed image can be modified by the user and used to generate an output signal.

43 Claims, 21 Drawing Sheets

FOREIGN PATENT DOCUMENTS

EP     1205143 A2     5/2002
EP     1422690 A1     5/2004

OTHER PUBLICATIONS

Chaudhary et al., "Visualization, Editing and Spatialization of Sound Representations using the OSE Framework," Proceedings of the Audio Engineering Society 107th Convention, 1999.

Chaudhary, "OpenSoundEdit: An Interactive Visualization and Editing Framework for Timbral Resources," Masters Degree Report, Computer Science, University of California, Berkeley, CA, 1998.

Chaudhary et al., "OpenSoundEdit: An Interactive Visualization and Editing Framework for Timbral Resources," 1998 International Computer Music Conference, Oct. 1998.

* cited by examiner

SIGNAL PROCESS AND SYSTEM

FIELD OF THE INVENTION

The present invention relates to a signal process and system, and in particular to a process and system for processing or visualizing data which may represent a quasi-periodic signal, such as an audio signal or a signal representing a measured physiological parameter.

BACKGROUND

Modelling and visualization of signals (including time-series and other forms of data sequences) have application in many fields, including mechanics, electronics, medicine, and audio processing for entertainment or intelligence.

The process of modelling a signal generally involves generating a mathematical representation of the signal referred to as a signal model, which can be used to generate a signal which may be identical to the signal being modelled, or more typically provides a close approximation to it. Existing signal models generally emphasize a certain aspect of the signal, as described further below. Depending on the task and field of application, a model is chosen accordingly to obtain a representation of a signal with emphasis on the corresponding aspect. The model is then used to generate a model signal or model instance representing the original signal, and this generated signal is either used directly or is visualized in some way.

One common signal model or representation, referred to as a 'waveform', represents the signal as an ordered sequence of amplitude values and associated respective values of time (or other variable on which the amplitudes depend), and is used when reproducing the signal or storing it as 'raw data'. A visualization of a waveform model is displayed directly as a graph of the signal amplitudes against the time values (or other variable values, as appropriate). Such visualizations can be readily comprehended by non-expert users, but are not compact, and may require inefficient zooming and scrolling to view particular portions of the signal.

Models based on Fourier or wavelet transforms represent the signal as a set of rather abstract coefficients that highlight the spectral or scalar aspects of the signal. Visualizations of such models display these coefficients as colour-coded values in a one or two dimensional domain. Such visualizations are more compact than waveform visualizations, but require a considerable amount of experience to interpret, and are not readily comprehended by non-expert users. Moreover, such models often involve applying 'windows' or otherwise filtering the signal, which limits the level of detail and accuracy of the model.

One signal aspect which is not well represented in any of the available models is referred to herein as the 'waveshape', i.e., the general geometric shape or morphology of a waveform, considered for the length of a signal cycle or period (assuming a periodic or quasi-periodic signal). The waveshape and its evolution over time can be an important aspect of a signal, e.g., when representing heart or other physiological conditions, faults in rotating or reciprocating machinery, or the timbre of a voice, musical instrument or other audio signal. Common examples of basic waveshapes include the 'square', 'sine' or 'triangle' waveshapes. Viewed qualitatively, a waveshape does not depend on the length of the corresponding signal cycle or period measured in time. For example, the waveshapes of a sine wave at a frequency of 50 Hz and a sine wave at 100 Hz are identical. It would be useful to provide a representation or visualization which describes the state and the evolution of the waveshape in a manner that is readily comprehended by non-expert users.

It is desired to provide a signal process and system and a normalisation process and system that alleviate one or more of the above difficulties, or at least that provide a useful alternative.

SUMMARY OF THE INVENTION

In accordance with the present invention, there is provided a signal process, including:
  processing signal data representing a signal having cycles of different lengths to determine said lengths of said cycles;
  generating, on the basis of the determined lengths, normalisation data for normalising said cycles to a common length; and
  generating cycle data representing alignment of a plurality of normalised cycles of said signal;
  wherein a first dimension of said cycle data represents successive normalised cycles of said signal or normalised time of said normalised cycles, a second dimension of said cycle data represents phase of said normalised cycles, and a third dimension of said cycle data represents amplitudes of said normalised cycles.

The present invention also provides a normalisation process, including:
  processing input data representing cycles of different lengths to determine said lengths of said cycles;
  generating normalisation data for normalising said cycles to a common length; and
  generating cycle data representing alignment of a plurality of normalised cycles of said input data;
  wherein a first dimension of said cycle data represents successive normalised cycles of said input data or normalised time of said normalised cycles, a second dimension of said cycle data represents phase of said normalised cycles, and a third dimension of said cycle data represents amplitudes of said normalised cycles.

The present invention also provides a signal process, including:
  generating image data representing a signal as a plurality of aligned cycles of said signal, a first dimension of said image data substantially representing successive cycles of said signal, and a second dimension of said image data representing a phase of said cycles, amplitudes of said signal being represented by colours and/or intensities assigned to said amplitudes;
  modifying said image data; and
  generating an output signal on the basis of the modified image data.

The present invention also provides a signal process, including:
  accessing image data representing a visual image; and
  processing said image data to generate an output signal on the basis of the received image data, said output signal including a sequence of signal amplitudes, each of said signal amplitudes corresponding to an intensity and/or colour of a corresponding location within said visual image, each amplitude being positioned within said sequence based on its location in said visual image.

The present invention also provides a signal processing system, including:
  a cycle normalisation component for processing signal data representing a signal having cycles of different lengths to generate normalisation data for normalising said cycles to a common length; and an image generation component for generating image data representing alignment of a plurality of normalised cycles of said signal.

The present invention also provides a signal processing system, including:
an image generation component for generating image data representing a signal as a two-dimensional graphical image, amplitudes of said signal being represented by corresponding intensities and/or colours;
an image modification component for modifying said image data; and
a signal generation component for generating an output signal on the basis of the modified image data.

The present invention also provides a normalisation system adapted to process input data having cycles of different lengths to generate normalisation data for normalising said cycles to a common length, and to generate cycle data representing alignment of a plurality of normalised cycles of said input data.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENTS

Figure 1:
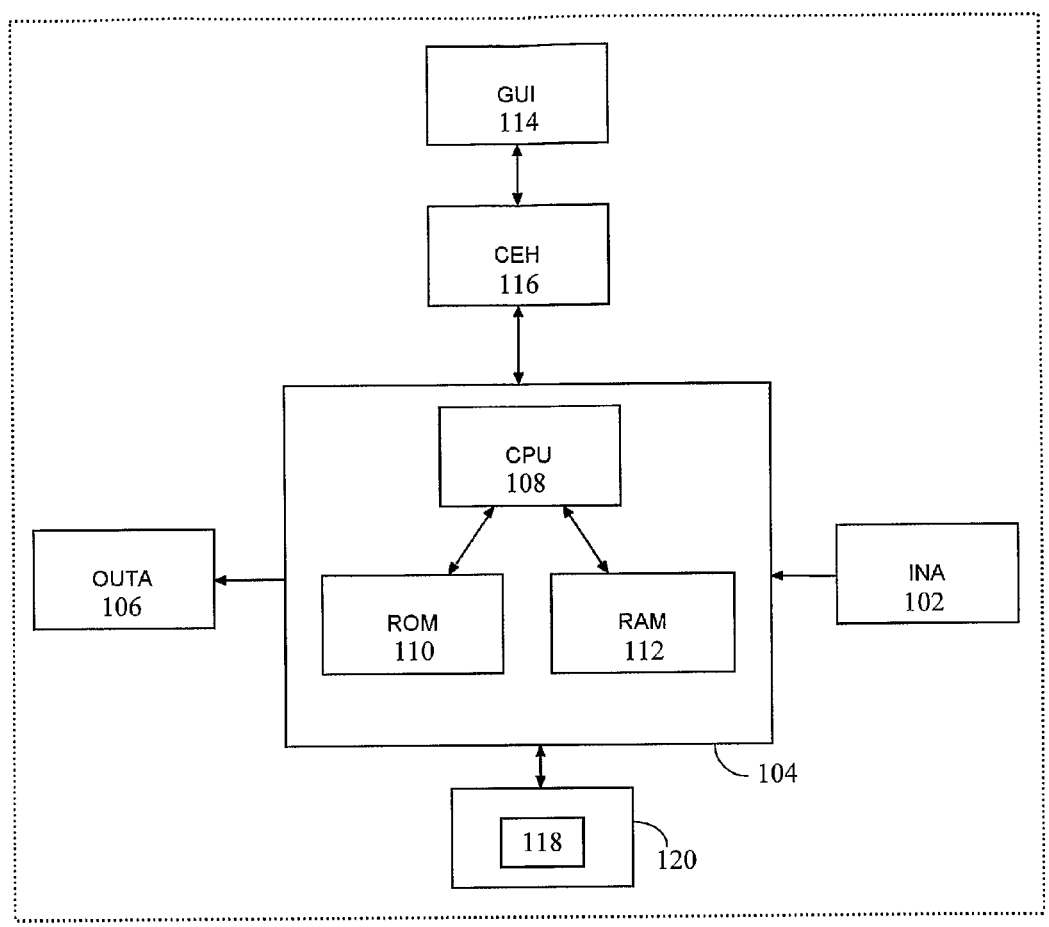
FIG. 1 is a block diagram of a preferred embodiment of a signal processing system.

As shown in FIG. 1, a signal processing system includes an input adapter 102, a signal processor 104, and an output adapter 106. The signal processor 104 includes at least one processor (CPU) 108, read-only memory (ROM) 110, and random access memory (RAM) 112, interconnected by a system bus (not shown). A user of the system interacts with the system via a graphical user interface (GUI) 114 generated by the system. A common event handler (CEH) 116 processes events generated by the GUI 114 and the signal processor 104. The signal processing system also includes signal processing modules 118, as described below.

The signal processing system executes a signal process that, inter alia, determines cycles (including cycles having different lengths) in input data provided to the system, generates normalisation data for normalising the cycles to a common length, generates images representing the normalised cycles so that structures and trends in the input data can be readily understood by non-expert users, allows users of the system to modify those images, and to generate output data from the modified images. The signal process is described below in terms of input data representing a time-varying signal. However, the signal process can be applied to determine cycles in any type of data, whether representing a signal or otherwise. In addition, the signal process is described below in terms of determining periods and cycles of the signal, being temporal cycles and periods; i.e., with respect to time. However, it will be apparent that the cycles determined by the process need not be limited to cycles in time, but can include cycles with respect to any dimension or variable of the data or signal.

In the described embodiment, the signal processing system is a standard computer system, such as an Intel™ IA-32 personal computer executing a Java-enabled operating system, and the signal process is implemented by software modules, being the signal processing modules 118 stored in nonvolatile storage memory (e.g., magnetic disk storage) 120 of the system and executed by the CPU 108. The software modules are preferably written in an object-oriented programming language such as Java. However, it will be apparent to those skilled in the art that the components of the system can be distributed over a variety of physical locations, and that at least parts of the signal process executed by the system can alternatively be implemented by dedicated hardware components such as application-specific integrated circuits (ASICs).

Figure 4:
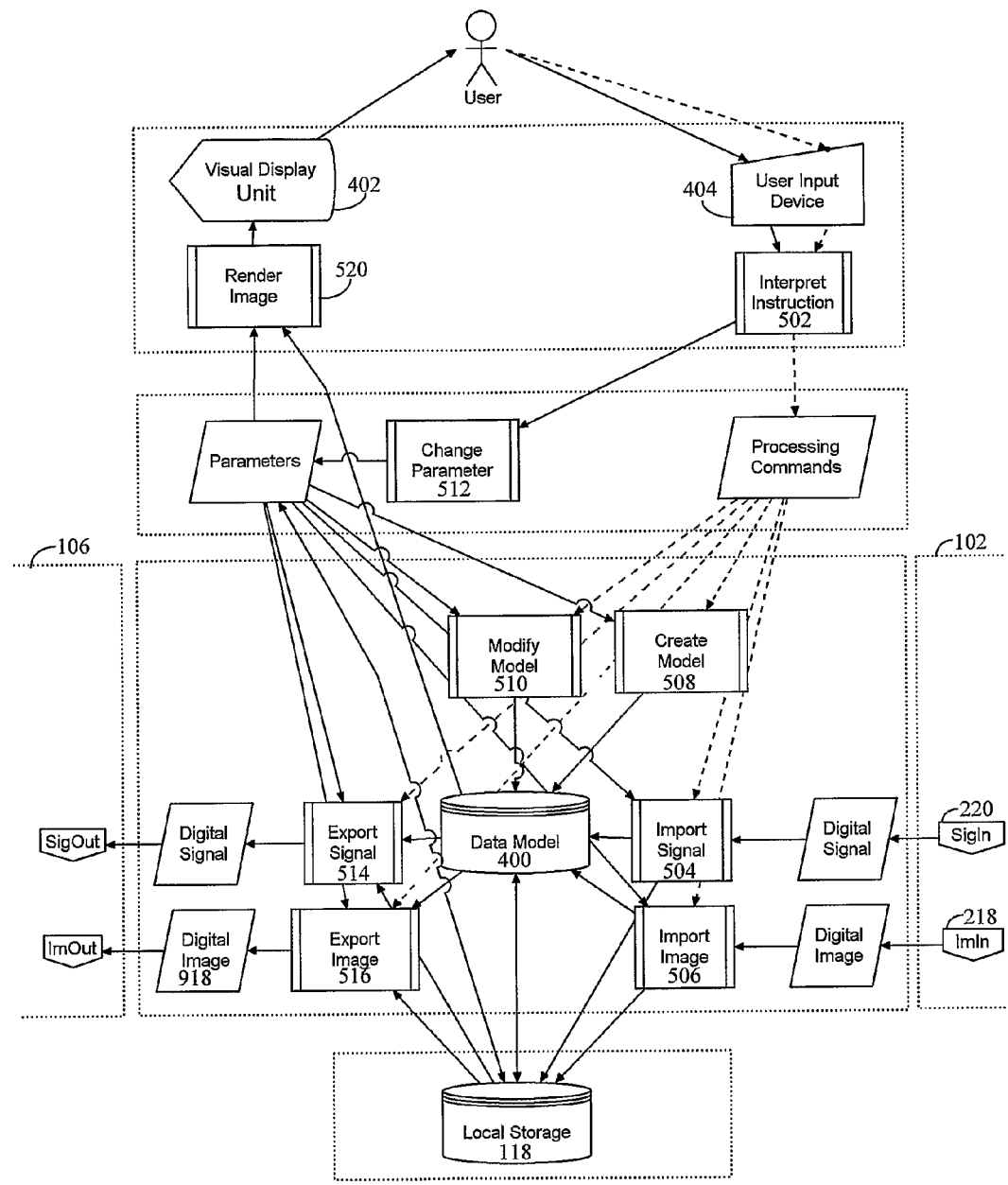
FIG. 4 is a schematic diagram illustrating data flows and processing steps of the system.

As described above, a user of the system can interact with the system via the graphical user interface (GUI) 114, which provides a single control channel to the control event handler (CEH) 116. However, it will be apparent that alternative embodiments could provide additional input channels, such as a MIDI interface for musical applications or a programming interface for automated control of the system. As shown in FIG. 4, a user of the system interacts with the GUI 114 via a visual display unit 402 and input device 404 such as a keyboard/mouse combination or a touch screen.

Figure 5:
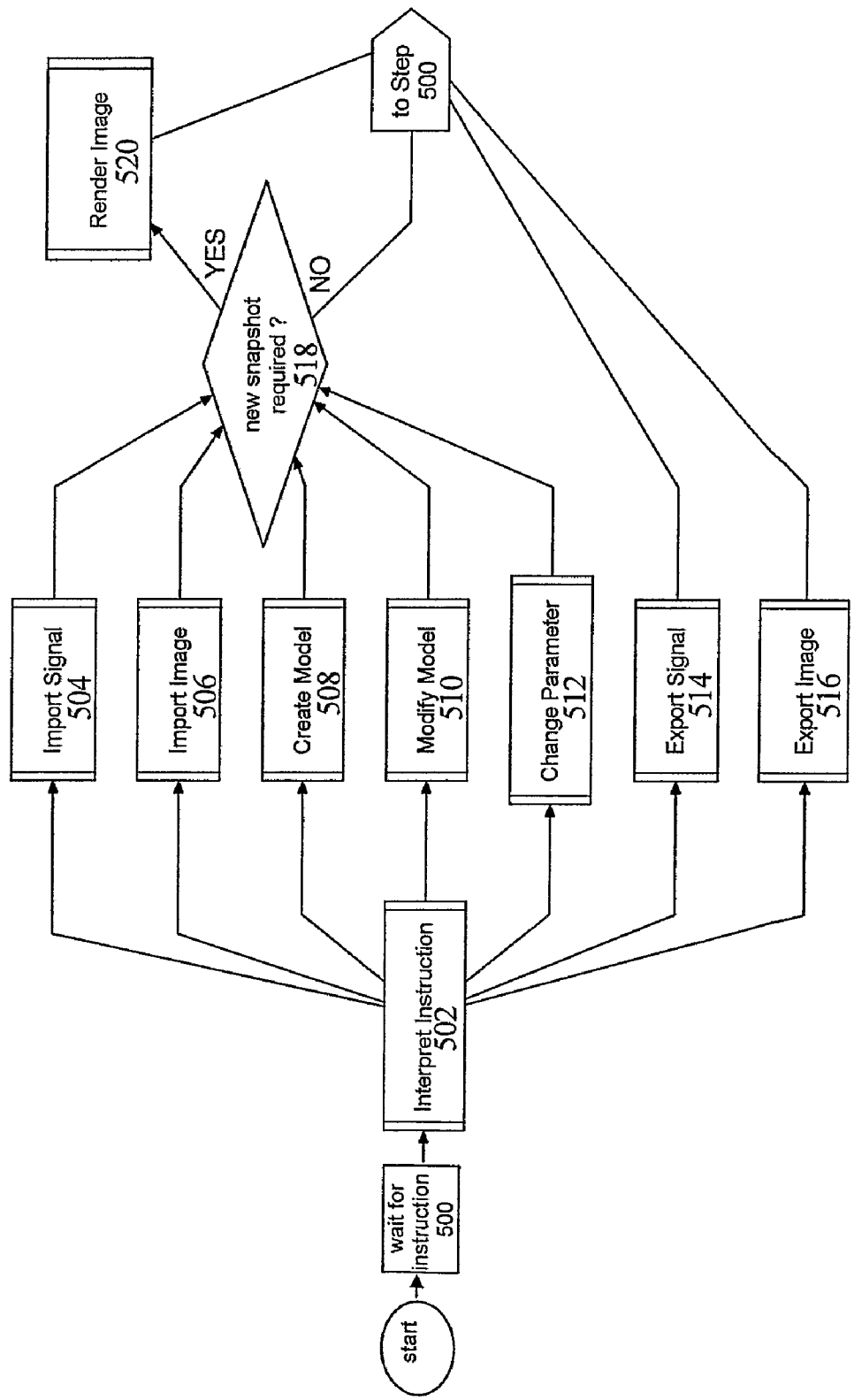
FIG. 5 is a flow diagram of a signal process executed by the system.

The GUI 114 provides a number of interactive controls that can be selected by the user to control operation of the system. The selection of a particular control of the GUI 114 generates an event that is processed by the CEH 116 to generate a corresponding command or instruction for the system. As shown in FIG. 5, the user's instruction is interpreted at step 502 of the signal process in order to identify the particular instruction issued by the user and initiate an appropriate process step selected from the process steps 504 to 516 of the signal process. For example, when the system is first initialised, the GUI 114 is generated and displayed to the user, and the system then waits for the user to input a command corresponding to either the create model step 508, the import signal step 504 or the import image step 506. For example, the user can initiate execution of the import signal process 504 in order to import an externally generated time-dependent signal into the system via the input adapter 102.

Figure 2:
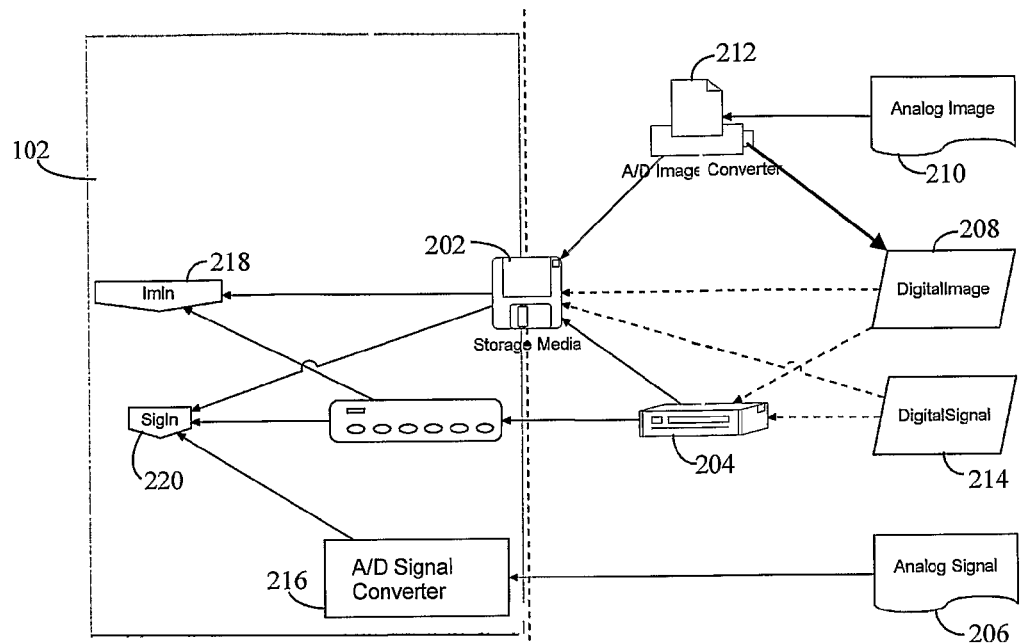
FIG. 2 is a schematic diagram illustrating data flows of an input module of the system.

The input adapter 102 provides connectors to which a digital or analog signal source can be connected. The input adapter 102 converts analog input signals into digital form so that all signals leaving the input adapter 102 are of digital form. As shown in FIG. 2, the input adapter 102 includes interfaces for storage media 202, remote sources 204 and analog signals 206. The solid arrows in FIG. 2 represent physical data transfer, whereas the dashed arrows represent logical data transfer. The storage media 202 include standard media for portable storage of digital data e.g., magnetic disk or tape, CD-ROM, DVD-ROM and RAM, and can be used to provide digital images 208 to the system. The digital images 208 can be generated from analog images 210 by means of an image converter 212 such as a scanner or digital camera. Each of the analog images 210 is an image in physical form, such as a photograph, paper document, painting or the light projected onto the sensor of a digital camera.

In this specification, the term 'digital image' refers to binary data representing colour or intensity values on a discrete grid. Typically, this is stored as a finite, two- or three-dimensional array of binary data. Similarly, the term 'digital signal' refers to a finite time-sequence of binary data.

The remote sources 204 include devices or systems external to the system, and provide stored, captured or generated digital data streams such as digital images 208 or digital signals 214 to the system. Examples of remote sources 204 include a personal computer or server in a local or remote network, an Internet broadcast station, signal processing unit, image scanner, a system hosting the signal processing system as an integrated component, or a second signal processing system of the kind shown in FIG. 1. The remote sources 204 can be directly connected to the input adapter 102 via standard interface connectors, including USB interface, S/PDIF input, analog/digital modem, or network interface connector (NIC) for local or wireless network.

The analog signals 206 can include the output of an audio device through playback or capture, output of a musical instrument or of a measuring device for physical data (such as an electrocardiograph, accelerometer, etc). Analog signals 206 are converted into digital signals by an analog-to-digital converter (ADC) 216, which can be a standard ADC card or computer sound card.

In an alternative embodiment, the input adapter 102 includes a RAM buffer to store segments of incoming live digital data streams before sending them to the signal processor 104. The size of the buffer depends upon the sampling frequency and resolution, and the processing power of the system processor(s); for a 3 GHz Pentium 4 processor, a 1-40 kilobyte buffer is typically sufficient.

In the described embodiment, all of the data associated with the input data, including the signal data 220, a period function 603 describing the change of signal period (i.e., the length of a signal cycle) over time, and a 'waveshape map' or cycle data 611 defined on a two-dimensional phase-time domain and representing the amplitude values of the signal, as described below, are stored as object instances referred to collectively as a 'data model' 400. The object instances of the data model 400 are instantiated and accessed by means of the object-oriented programming features of the Java programming language. However, it will be apparent to those skilled in the art that other object oriented programming languages could be alternatively used.

Each function or map contained in the data model 400 is stored in two corresponding arrays respectively containing base (abscissa) points and corresponding function (ordinate) values that depend on the base point values. These arrays can be accessed directly for further processing of function data, as is the case in the cycle determination process described below. Alternatively, these arrays can be used to generate function values by means of a (e.g., Java) 'method' returning interpolated and/or extrapolated values to improve accuracy. Discrete data is therefore stored as such, but can be used as continuous data. Conversely, continuous data represented in the data model 400 (e.g., as a selected mathematical formula and associated coefficients) can be sampled on a grid and converted to discrete data in order to improve computational performance. Accordingly, in the following description, no particular distinction is made between data that is continuous on the one hand, or discrete on the other, since either form is readily converted to the other form.

Figure 17:
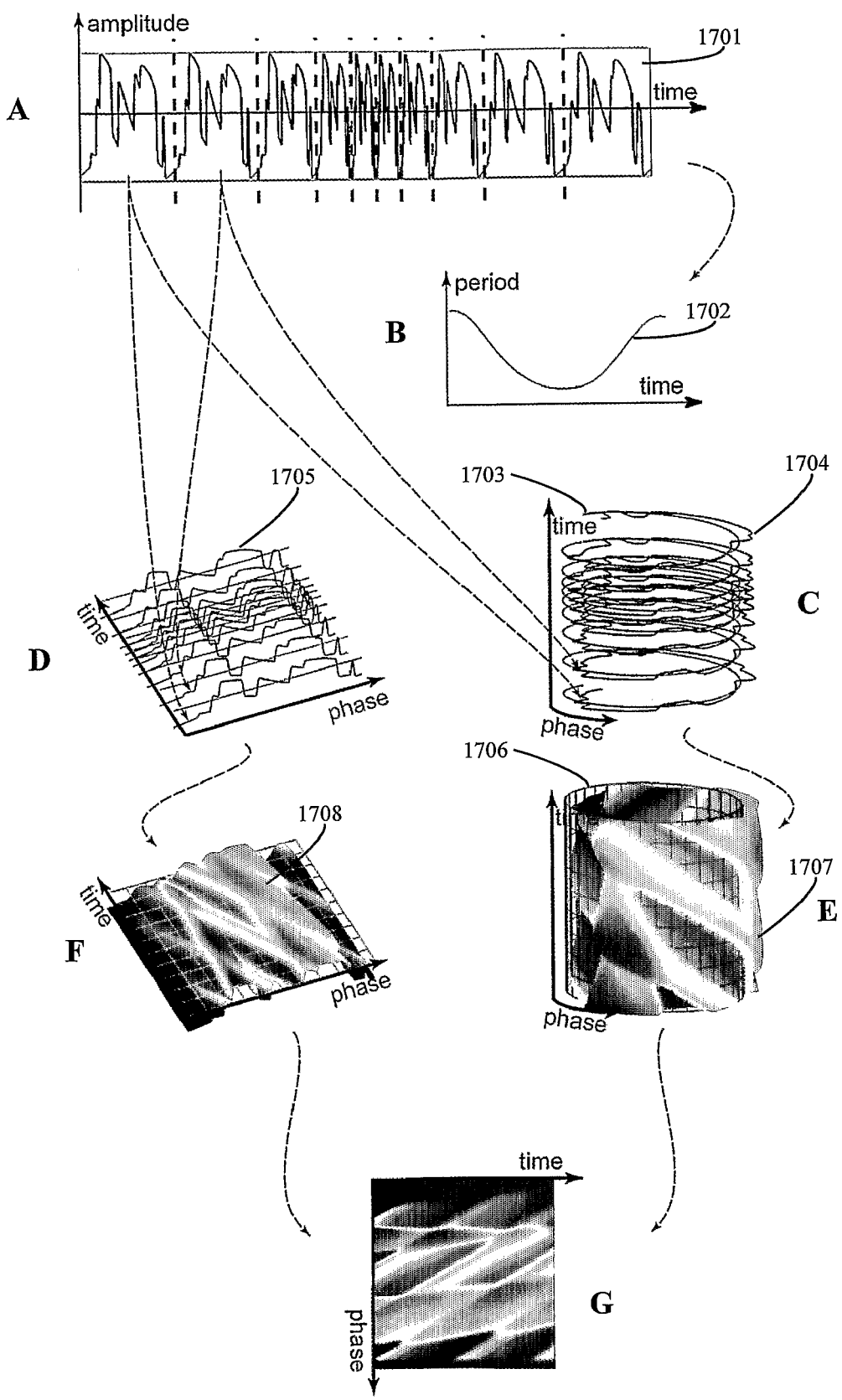
FIGS. 17A to 17G are graphs illustrating various stages of the signal process.

A digital input signal 220 including amplitude values $a_i \in [-1,1]$, at respective equally spaced times $t_i$ ($i=0, \ldots, L$) is provided to the signal processor 104 from the input adapter 102. For example, FIG. 17A shows an input signal 1701 in which the period temporarily decreases. The signal process begins at step 602 by executing a cycle determination process that attempts to determine a cycle or period function $T(t)$ 603 representing the (changing) period of the input signal over time. For example, FIG. 17B is a graph of a period function 1702 generated from the input signal 1701 of FIG. 17, clearly showing the temporary decrease in period.

The period function 603 $T(t)$ represents the cycle lengths of the periodic or quasi-periodic portions (i.e., cycles) of the input signal as a function of time, and is used to generate normalisation data representing a time embedding or mapping function 607 $t \rightarrow \gamma(t)$ that maps the time domain of the input signal into a two-dimensional phase-time domain to provide a mapped or scaled signal 609 of constant period in the phase-time domain. That is, the time embedding normalizes the varying signal periods to a single common period, and can be considered to separate signal phase from time.

In the described embodiment, the period function is determined on the basis of discrete values of T(t) specifying the signal period at times where it is required for the generation of the time-embedding or mapping function values. The periods of the signal are determined using an average magnitude difference function (AMDF) (see, for example section 8.3.1 of "Pitch Determination of Speech Signals", Wolfgang Hess, Springer 1983 ("Hess")). In contrast to the AMDF described in Hess, the AMDF used by the signal process, referred to as D in what follows, is normalized, is less sensitive to base line shifts, and uses a dynamically varying, adaptive window size.

The function D is defined on a two-dimensional discrete mesh or grid with directions or axes corresponding to the time t along one direction or axis (typically horizontal when visualised), and the period length T along the other (typically vertical) direction or axis. The default size of the grid is $2^7$ data pairs, but this can be changed by the user if desired. As the time values $t_i$ considered here are equally spaced, D can be expressed in terms of the sample index i of the signal times $t_i$, where D(i,j) represents the average difference between the signal portions corresponding to the index intervals [i−j,i−1] and [i,i+j−1] and as such is based on the geometrical features of the signal waveform. The difference function used in the described embodiment is given by:

$$D(i, j) = \frac{\sum_{k=0}^{j-1} |(a_{i-j+k} - m_{i-j,j}) - (a_{i+k} - m_{i,j})|}{\sum_{k=0}^{j-1} |a_{i-j+k} - m_{i-j,j}| + \sum_{k=0}^{j-1} |a_{i+k} - m_{i,j}|}$$

where $$m_{i,j} = \frac{1}{j} \sum_{k=0}^{j-1} a_{i+k},$$

and $a_i$ represents the $i^{th}$ signal amplitude value. However, other difference functions could alternatively be used. For this choice of AMDF, the difference values D(i,j) range between 0 and 1. This provides a normalized measure of difference (and allows further attributes such as 'accurate' and 'quasi-periodic' to be quantified, as described below), independent of the absolute magnitude of the signal.

Figure 10:
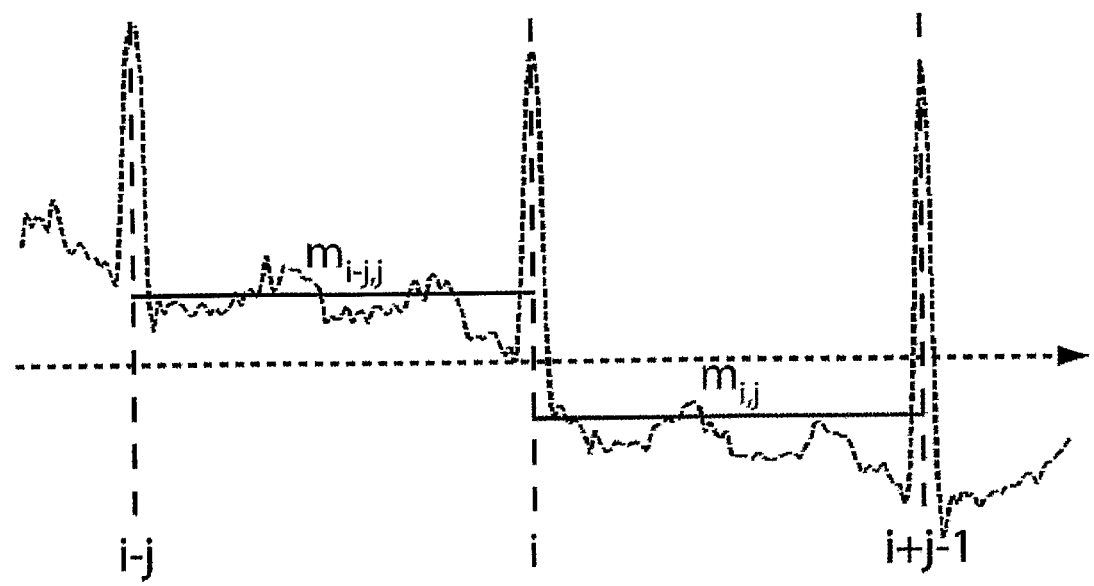
FIG. 10 is a waveform representation of a signal, illustrating quantities used by the cycle determination process of FIG. 11.

As shown in FIG. 10, the values $m_{i,j}$ approximate the signal in the index range [i,i+j−1] by a stepwise constant function defined as the mean of the signal values in the index window [i,i+j−1]. The differences taken between the amplitude values a and the mean amplitude values m in the formula for D makes D independent of any vertical offset in the signal. Removing vertical offset before taking the difference of the two signal windows provides a difference function which is less sensitive to slowly occurring 'base line shifts'. This can be of particular importance for some applications; for example in signal data taken from an electrocardiograph where cardiac cycles may have significant offset, as shown in FIG. 10.

In an alternative embodiment, the quantities $m_{i,j}$ could be defined to fit the evolution of the offset of the signal more accurately, e.g., by using a polynomial approximation of the signal a, rather than a constant value, such as that shown in FIG. 10.

In contrast to a standard AMDF (such as described in Hess, for example), where the difference window is of fixed size, the size j of the difference window of the AMDF D described herein is equal to the candidate index j for the period length.

As will be appreciated by those skilled in the art, there is no mathematically unique definition of the 'fundamental' signal period. However, the variation between the most commonly used definitions is typically small. While the exact definition of period or cycle used in the described embodiment is given by various selection criteria and parameters, as described below, it is based on the concept that the period $T(t_j)$ at time $t_j$ corresponds to the 'smallest' choice of length T of two adjacent intervals $[t_j-T, t_j)$, $[t_j, t_j+T)$ such that the 'difference' between the corresponding signal portions is minimized.

The period determination process thus attempts to determine a mapping function of the form i→T(i) in the domain of D such that j→D(i,j) has a local minimum in T(i). Such minima in D as a function of T are referred to herein as 'dips', and the set {D(i,j)|i,j=0, ..., L} is referred to as a 'correlogram', a term taken from auto-correlation methods. The first index i represents the absolute index or position along the signal (i.e., time), and the second index j represents a value of the cycle length or period that is being tested. Thus the period determination process generates values of the difference function D for a wide range of trial or candidate cycle lengths or periods, each value of D being a numeric value between 0 and 1 representing the difference between adjacent portions of the signal, each portions being of length j, the trial cycle length. When the trial cycle length matches the actual spacing between repeating features in the amplitude variations of the signal (such as the repeating spikes in FIG. 10, for example), the difference function will provide a relatively small value (zero in the case of a signal that is exactly periodic over the considered range). Thus actual cycle lengths in the signal should be indicated by j values providing minima in D. A correlogram can be visualised as a two-dimensional map of D values as a function of position within the signal i, and trial cycle length j, with D values represented in colour to make the minima (or 'dips') readily apparently to the viewer.

While dips are necessary criteria for successfully determining periods, they are typically not sufficient. This is easily seen for a periodic signal of fixed period $T_{const}$ which produces dips at $n^*T_{const}$, n=1, 2, 3, ... because any two neighbouring n-tuples of cycles are equally similar. For this reason, dips corresponding to integer multiples of the same 'fundamental' or first order (n=1) period are therefore grouped together in what is referred to herein as a 'fundamental dip group' (FDG).

The minima of correlograms are determined by applying principles of multi-resolution analysis. To improve computational efficiency, the number of computationally expensive evaluations of D(i,j) is reduced by initially considering values of D evaluated on a coarse mesh or grid to identify approximate locations of minima, as described below. Once approximate locations of minima have been found, the actual locations of the minima are then determined in a second phase, where the number of evaluations of D(i,j) is limited to the number required for a sufficiently accurate determination of the time-embedding in the further steps of the signal import process 504, as described below.

Figure 11:
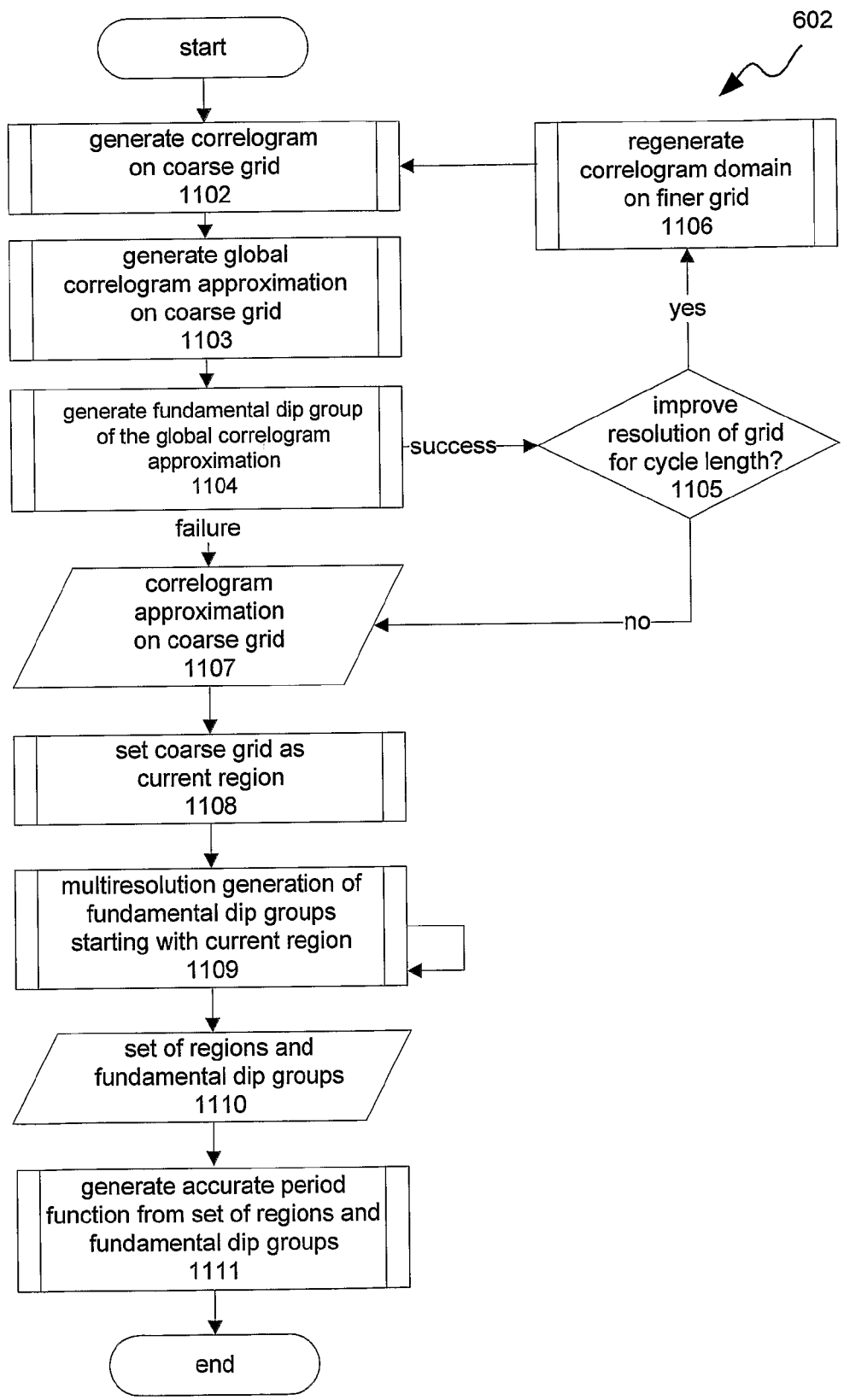
FIG. 11 is a flow diagram of a cycle determination process executed by the system.

As shown in FIG. 11, the cycle determination process begins at step 1102 by evaluating D on a sub-grid ($m^*k_i$, $n^*k_j$), m,n=0 ... $2^N-1$ of the correlogram domain, where N is by default 7 but can be selected (e.g., to be 6 or 8) by the user, and the integer $k_i$ is chosen such that $2^N-1^*k_i>=L$. This grid is coarse compared to the number L of grid points in the complete or full resolution correlogram, but delivers sufficient information on the difference function to determine the existence and approximate locations of any minima of T(t).

Figure 16:
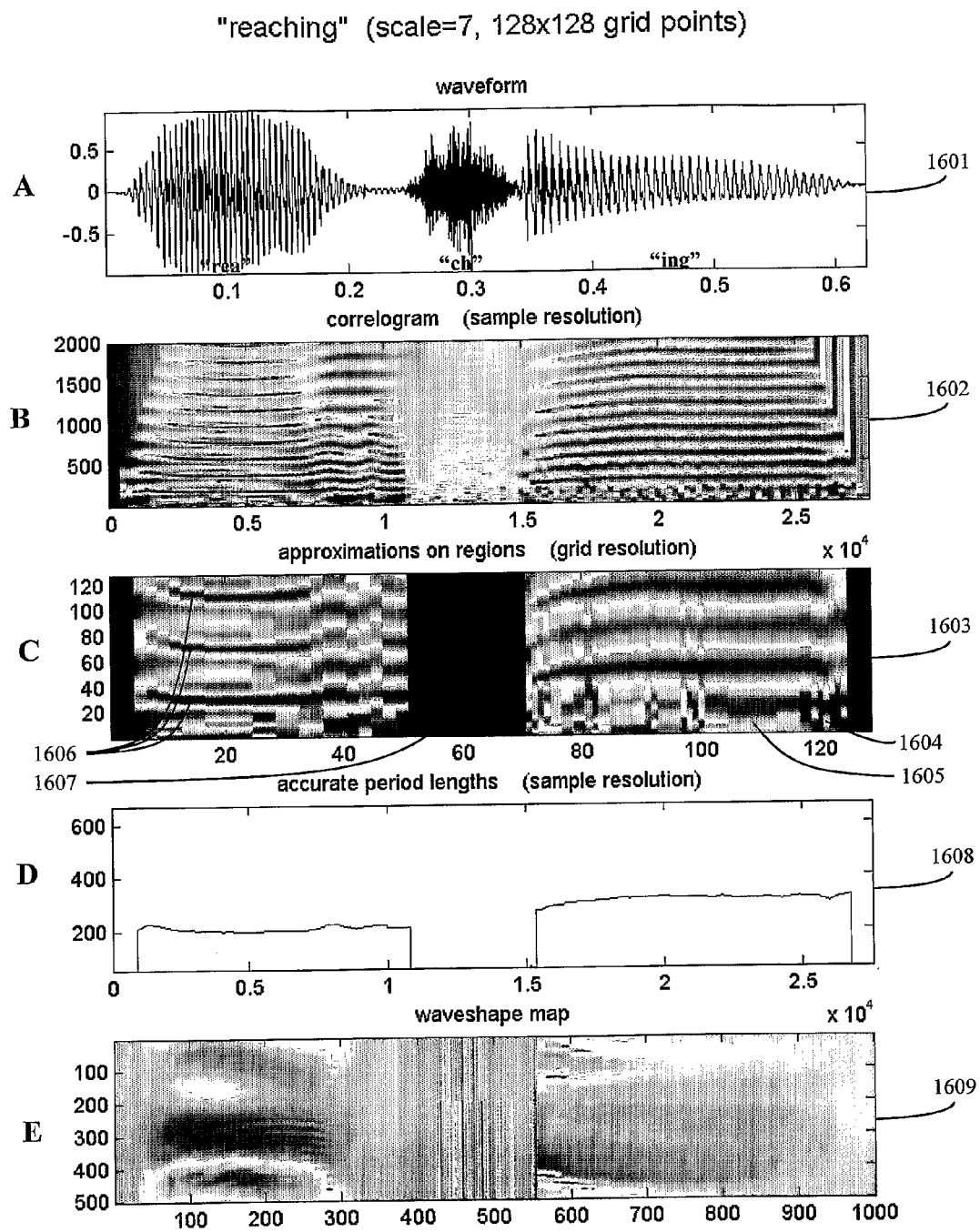
FIG. 16A is a graphical representation of a waveform of an audio signal representing a spoken word, showing signal amplitude as a function of time.
FIG. 16B is a correlogram of the waveform of FIG. 16A, the two dimensions of the correlogram representing period (vertical dimension) and time (horizontal dimension) in units of sample resolution.
FIG. 16C is an approximated correlogram (in grid units) of the waveform of FIG. 16A, generated by the cycle determination process.
FIG. 16D is a graph of an accurate period length function of the waveform of FIG. 16A (in units of sample resolution)
FIG. 16E is a colour coded graph of a waveshape map for the waveform of FIG. 16A, the vertical dimension representing phase, the horizontal dimension representing time.

A typical choice of N, $k_i$ and $k_j$ in the case of a 1 second audio recording sampled at 44.1 kHz is a grid of 128×128 points covering a correlogram area of 44100×2500 points. For example, FIG. 16C shows a correlogram 1602 of a spoken word with a resolution of 128×128 points.

A global approximation of the correlogram, explicitly depending on T-values only, is then generated at step 1103 by averaging the correlogram values in the t direction:

$$(m, n) \to \overline{D}_0(n) := \sum_{l=0}^{2^N-1} D(l*k_i, n*k_j).$$

In the following steps 1104 to 1107, the problem of finding a "minimum curve" T(t) of the correlogram is reduced to finding the FDG of $n \to \overline{D}_0(n)$, $n=0 \ldots 2^N-1$. The period length corresponding to the FDG then is used as a first approximation for T.

This is first attempted at step 1104, as described below, which in the case of success, delivers an FDG and thus an estimate on the location of the minima T(t). Depending on this estimate, the process decides at step 1105 whether it would be advantageous to reduce the coarseness of the correlogram domain grid in the T-direction (vertically) at step 1106 and to restart by generating correlogram values for the finer correlogram grid at 1102 again.

Specifically, the criteria applied at step 1105 are as follows. If the FDG found at step 1104 contains more than one dip, then the distance $T_{12}$ between the T-location of the fundamental dip and the T-location of the second dip (i.e., the dip corresponding to twice the fundamental period) of the FDG is determined. The finer grid is then generated in a way such that the vertical grid boundaries are at least $1.7*T_{12}$ away from these two dips.

Alternatively, if the FDG found at step 1104 contains exactly one dip, and the vertical coordinate (i.e., corresponding to cycle length or period) of this dip is 'close to the lower or upper boundary of the grid' (defined in this embodiment as being when the distance to the boundary is less than 0.2 times the grid height), then the grid is chosen such that it covers T-values between $T_{FDG}/1.7$ and $T_{FDG}*1.7$, where $T_{FDG}$ is the T-location of the dip of the FDG found at step 1104.

If, at step 1104, the FDG could not be generated (e.g., no minima were found, or no further splitting is possible), or the finer grid was not considered to be advantageous at step 1105, then the initial vertical domain $n*k_j$, $n=0 \ldots 2^N-1$ of the correlogram is considered in the following steps. Typically, step 1106 is executed zero or one time only, as repeated narrowing of the grid is not usually found to provide any benefit. This vertical adjustment phase ends with a global correlogram approximation given by a single function $n \to \overline{D}_0$ $(T_n)$ $n=0 \ldots 2^N-1$.

Figure 12:
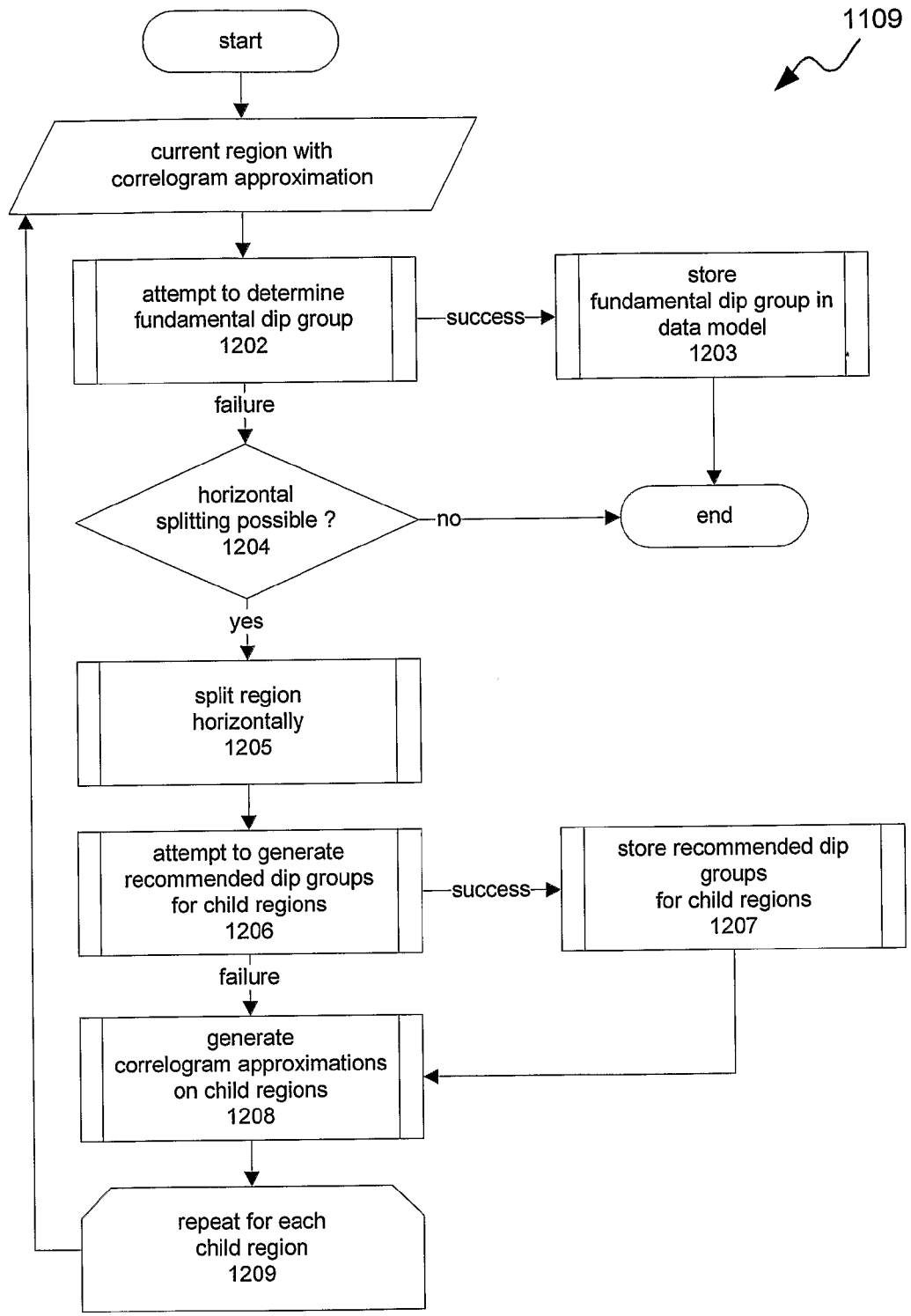
FIG. 12 is a flow diagram of a recursion process of the cycle determination process.

At step 1108, the coarse grid is selected as the current region for a subsequent recursive process. At step 1109, the recursive process generates a global correlogram approximation with higher horizontal (i.e., time) resolution. As shown in FIG. 12, the recursive process 1109 starts with an attempt to generate the FDG for the currently selected region and the global approximation of the correlogram at step 1202, as described below, which in the case of success is stored in the data model at step 1203, completing the recursive process 1109.

Otherwise, for the case of a failure notice being returned by step 1202, the width of the current region, measured in points of the coarse grid, is used at step 1204 to determine whether the current region can be split horizontally. If no splitting is possible (because the corresponding region is only 1 grid spacing wide), then the recursive process terminates without storing an FDG. Otherwise, the region is divided into two 'child regions' of equal width at step 1205, and at step 1206 the process attempts to determine a dip group recommendation for the newly created child regions. The dip group recommendation is determined by the same process steps used to determine the FDG at step 1202, but using less restrictive thresholds for 'accuracy' and 'quasi-periodicity', as described below with reference to FIG. 13. If one or more recommended dip groups were generated, then they are stored in the data model at step 1207. In either case, the process continues by generating approximate correlograms for the respective child regions at step 1208, using the same process steps previously used to generate the global approximate correlation at step 1103. The process then creates a sub-process for each of the two child regions at step 1209. These sub-processes start at step 1202 and generate one or more approximations of the correlogram for the corresponding current region. The horizontal splitting thus provides an increase in the approximation resolution by at least a factor two.

Figure 13:
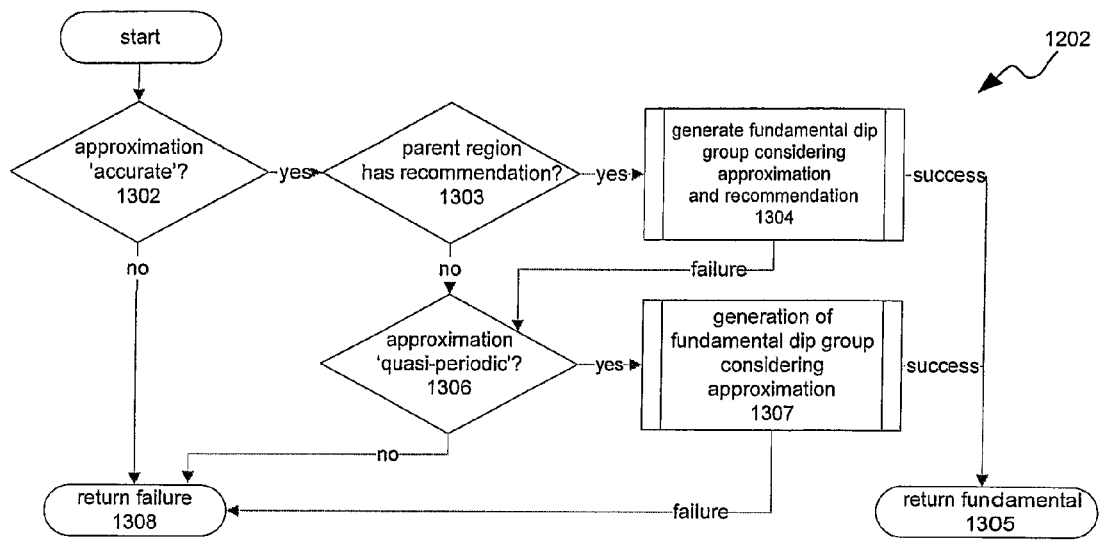
FIG. 13 is a flow diagram of a dip group process of the recursion process.

In contrast to step 1104 where no accuracy check for the generated FDG is carried out, the generation of the FDG at the FDG generation process 1202 includes an accuracy check of the approximation at step 1302 of the FDG generation process 1202, as shown in FIG. 13. The accuracy of approximation is defined by the mean absolute difference between approximation values and correlogram values taken over the corresponding region, and should not exceed a threshold value ($\approx 0.05$). If, at step 1303, it is determined that, for the current region, the data model contains a recommended dip group, then the generation of the FDG at step 1304 takes into account the current region's approximation as well as this stored recommendation, as described below. If step 1304 fails, or 1303 finds no recommendation, then the approximation is used to determine at step 1306 whether the signal is quasi-periodic on the (time-direction of the) region. The criteria for quasi-periodicity is based on the corresponding approximation function $n \to \overline{D}_{k,l}(n)$ (where k indicates the level of resolution and j is an enumeration index). In essence, if the product of the normalized mean variation of this function and the maximum 'depth' of its dips is larger than a threshold value ($\approx 0.02$), then the signal is considered to be quasi-periodic on the region. For this case, the FDG is generated at step 1307, considering the approximation only. The process carried out at step 1307 is identical to step 1104. If, step 1304 or step 1307 succeeds, then the FDG is returned at step 1305; otherwise, a failure notice is returned at step 1308.

Figure 14:
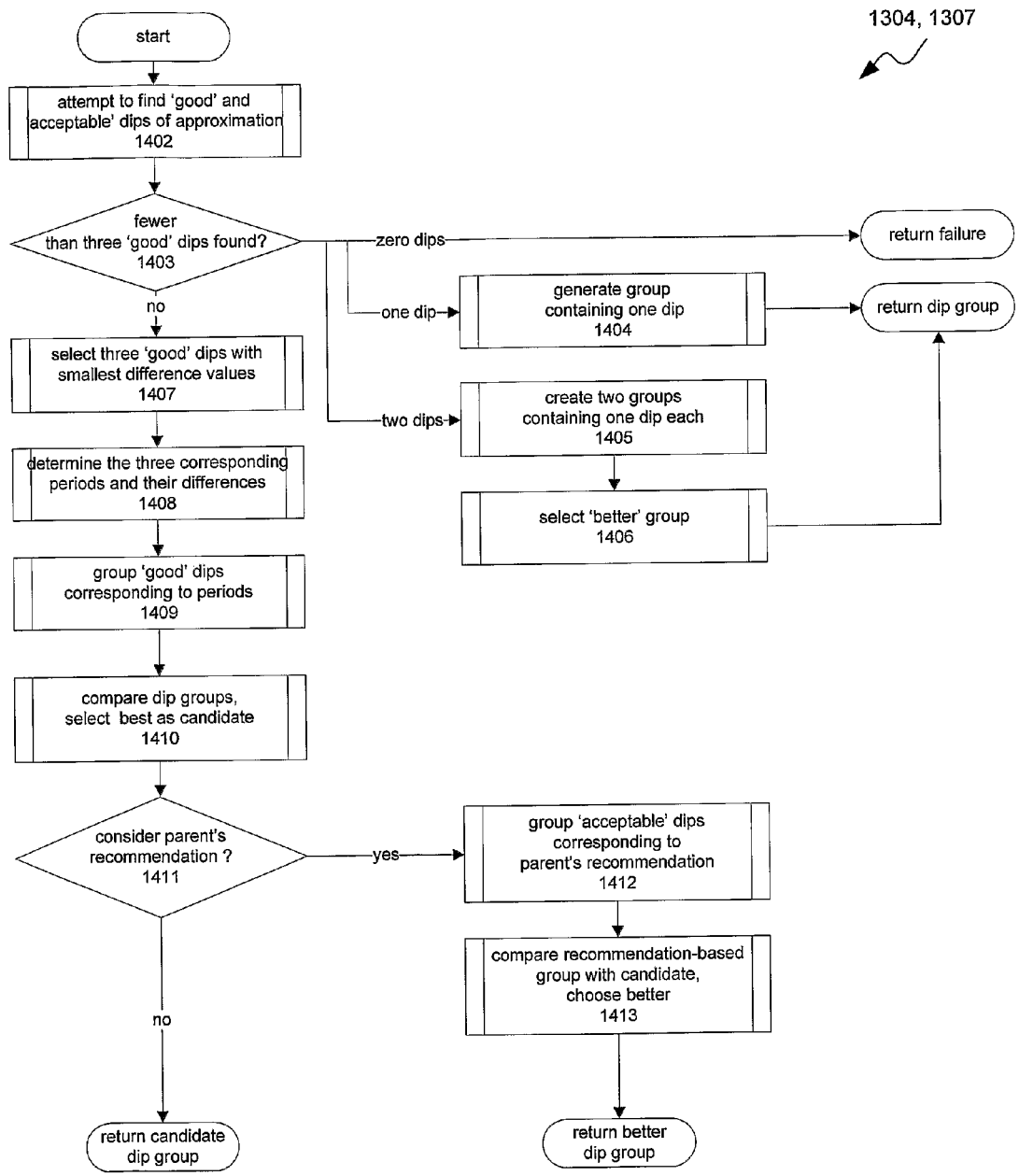
FIG. 14 is a flow diagram of a sub-process of the dip group process.

The steps of the FDG generation process of steps 1304, 1307 are shown in FIG. 14. Using two different thresholds for the difference function evaluated on dip candidates, sets of 'good' and 'acceptable' dips of the current approximation $\overline{D}_{k,l}$ are identified at step 1402. In the described embodiment, a 'good' dip is defined to be one having a D value $\leq 0.5$, and an 'acceptable' dip is one having a D value satisfying $0.5 < D \leq 0.7$. If fewer than three 'good' dips are identified, then step 1403 branches to one of three trivial cases (steps 1404 to 1406), otherwise the three dips with the smallest values of $\overline{D}_{k,l}$ are selected from the set of 'good' dips at step 1407. Their vertical location within the correlogram domain corresponds to period lengths $T_1$, $T_2$, $T_3$ which together with the differences $T_4=|T_1-T_2|$, $T_5=|T_1-T_3|$, $T_6=|T_2-T_3|$ define six candidates for a fundamental period of this approximation (step 1408). For each of these candidates $T_i$, the 'good' dips corresponding to an integer multiple of $T_i$ are grouped at step 1409 and compared at step 1410 to determine the 'best' group according to some fixed set of rules.

In the described embodiment, the rules are as follows: dip group A is considered to be better than dip group B if either:
(i) the fundamental period of A is less than the fundamental period of B AND A has at least one dip which has equal or lower corresponding D-value than any dip of B; or
(ii) the smallest D-value on the dips in A does not exceed the D-value of any dip of B by more than 0.1.

If it is found at step 1411 that, for the current region, a recommendation of dip group is stored in the data model (as is the case for step 1304), then the 'acceptable' dips corresponding to integer multiples of the period length defined by the recommendation are collected in a separate group (step 1412) which at step 1413 is compared with the group found at step 1410.

Referring to FIG. 11, on termination of all the recursive sub-processes created at step 1109, the data model contains a set 1110 of regions with a horizontal resolution of $2^k$ (where k typically varies between regions) and a vertical resolution of $2^N$ points of the initial coarse grid. The data model also contains functions $(m,n) \rightarrow \overline{D}_{k,l}(n), n=0 \ldots 2^N-1$, approximating the correlogram for these regions and, for the quasi-periodic signal regions, there is an FDG for the corresponding function, specifying the approximated period length.

FIG. 16A shows the waveform 1601 (signal amplitudes as a function of time) of an audio signal generated by recording an utterance of the word "reaching". FIG. 16B shows the corresponding correlogram 1602 (i.e., an image with the length of the signal portion (i.e., trial or candidate period being evaluated) represented along the vertical dimension and time represented along the horizontal dimension, both in units of sample resolution, with colour indicating the value of D at each point), and FIG. 16C shows the result 1603 (at grid resolution) of the recursive multi-resolution process applied to the correlogram 1602. It can be seen that for regions of more detail, e.g., region 1604, the process provides a higher horizontal resolution (thus a higher density of approximations) than for regions with less detail, e.g., region 1605. There are two quasi-periodic signal sections where the FDGs of each approximation are seen clearly as group of dark blue horizontal stripes 1606. For non-quasi-periodic sections such as the central region 1607, no approximation is shown, because the difference function has no distinct dips, and thus no FDG was found.

The PDA process completes at step 1111 by iterating through the regions stored in the data model and, if a FDG exists for the region, by generating an accurate period function, as described below.

A high level of accuracy of the period function is important. For example, if generated via the frequency domain, the resulting errors may be intolerable, depending on requirements, in particular for signals with relatively low frequency. The resolution of the correlogram domain corresponds to the length of a signal sample. Determining the period length from the correlogram therefore limits time resolution to one sample. While this resolution (e.g., 0.025 milliseconds for an audio signal sampled at 44.1 kHz) is sufficient in many cases, it can still be improved. The importance of this improvement can be seen in the case of a periodic signal with frequency 99.90009 Hz. If this signal is sampled with 10,000 Hz sampling frequency, then the sample length implies a period resolution of 0.1 milliseconds, and the most accurate value that can be obtained for the period is therefore 10 milliseconds. Compared to the exact period of 10.01 milliseconds, this difference will cause a noticeable error in the segmentation of the signal into its cycles, as the starting points of the cycles determined using from the period function will slowly drift away from their correct locations. In fact, at 1 second signal time (i.e., after ~100 cycles), the error of the starting point will be 1 millisecond; i.e., 10% of the cycle length, or 36 degrees of phase. The process for generating an accurate period length at step 1111, as described below, significantly decreases such errors by considering higher order dips (corresponding to 'undertones' of the signal).

Figure 15:
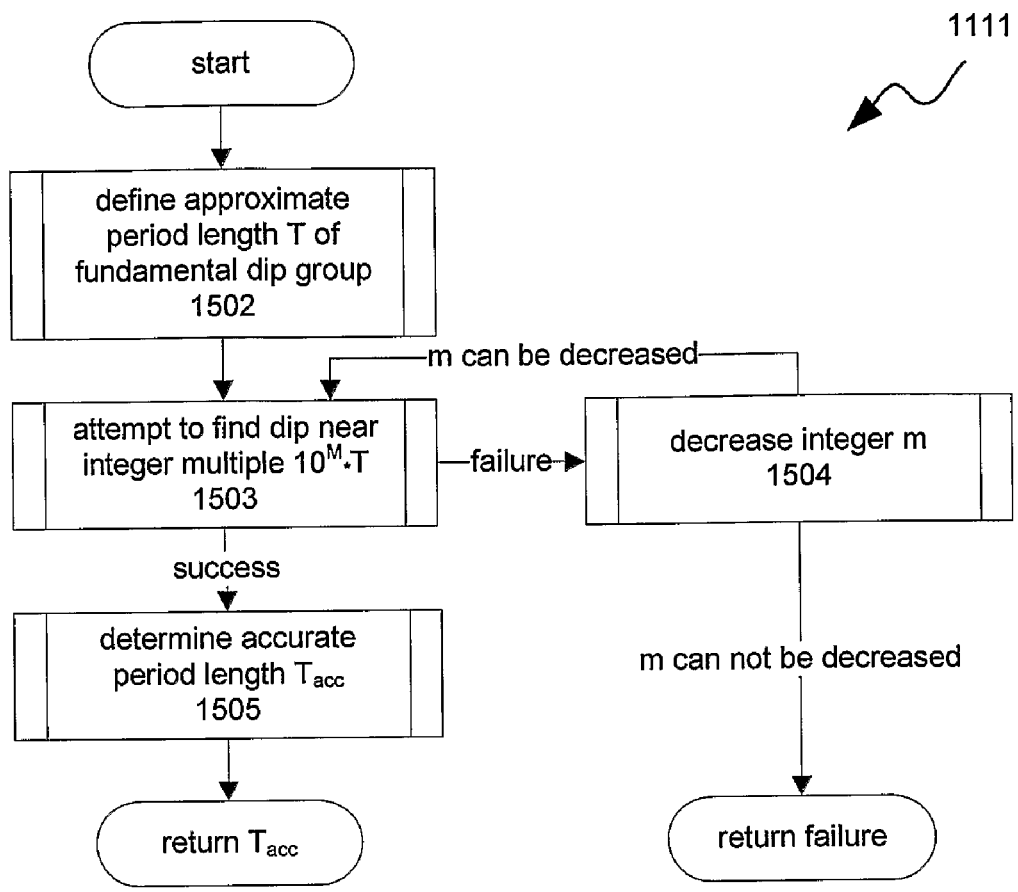
FIG. 15 is a flow diagram of a period determination process of the cycle determination process.

As shown in FIG. 15, the period function generation process 1111 begins at step 1502 by determining an approximate period length T from the FDG. For a given time $t_i$ (within the region), at step 1503 the process then attempts to determine an accurate period length with a precision of $10^{-M}$ samples (where M is a small, non-negative integer, e.g., 1, 2). This is achieved by attempting to locate a dip of the difference function $j \rightarrow D(i,j)$ near $10^{M}*T$. If a dip is found, then an accurate period length is determined by dividing the dip location by $10^M$ at step 1505, in which case the result is stored as a real number (Java 'double' or 'float' type), thereby providing a high to accurate period length with precision $10^{-M}$, measured in samples. If step 1503 fails, then m is decreased by 1 at step 1504 and step 1503 is tried again with the new value for m. For m=0, step 1503 returns a more accurate value for the approximate period length T determined from the coarse grid.

Referring to the speech example described above, FIG. 16D shows the resulting period function 1608 (in units of sample resolution) determined from the correlogram 1602 of FIG. 16B.

Returning to the example of a 99.90009 Hz signal above, it is seen that this accurate period determination process determines the period as 100.1 samples, thus 10.01 milliseconds, even for a sampling rate of 10,000 Hz. This is identical to the result obtained if the signal is sampled at 100,000 Hz. In contrast to prior art process, the period determination process 1111 of FIG. 15 provides highly accurate results and is less dependent on the sampling rate of the input signal.

Figure 6:
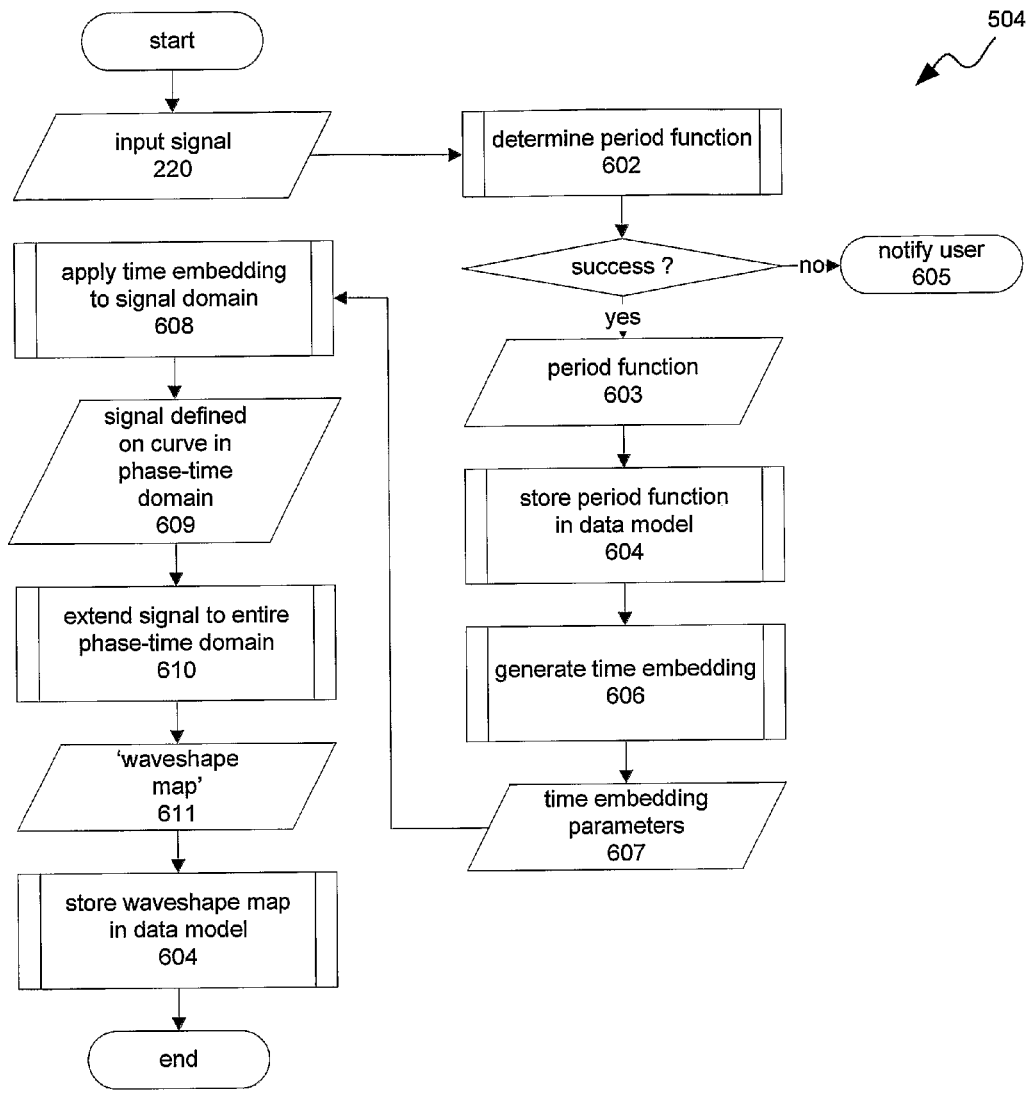
FIG. 6 is a flow diagram of a signal import process of the signal process.

In some cases, the nature of the input signal may not permit the determination of a period function at all, in which case the import process of FIG. 6 fails with a notification displayed to the user at step 605.

In an alternative embodiment, the user is invited to select from a list of possible candidate functions or to define the period function T(t) 603 using text input or a graphical interface tool. For example, depending on the nature of the signal, an explicitly defined T(t) can be used to specify a particular segmentation of the signal into intervals (not necessarily corresponding to the signal cycles). For polyphonic sounds, the generation of an FDG will produce equally 'good' candidates corresponding to the multiple pitches found in the signal. The user then may select which FDG is to be used for the subsequent determination of exact pitch.

Additionally, in an alternative embodiment, the system can receive and store time-dependent period values, such as values derived from measuring the angular speed of a rotating or reciprocating machine or the heart rate (or other measured quasi-periodic physiological parameter) of a patient, for example.

If the determination of the period function T(t) 603 was successful, this function 603 at step 602 is added to the data model 400 at step 604.

In the steps that follow, a three-dimensional representation of the signal 220 is generated by aligning successive values of the signal 220 that correspond to the same phase within each cycle defined by the period function determined at step 602. That is, the system generates data representing alignment of the normalised cycles of the signal. Such three-dimensional representation of the signal 220 is generated by mapping (also referred to herein as 'embedding') the signal 220 onto a cylindrical coordinate system, where the usual cylindrical coordinates of θ, h, and r and correspond to signal phase, normalized time, and amplitude, respectively. The space defined by the θ and h coordinates is referred to herein as the 'phase-time domain'. The time domain of the signal 220 is represented as a three-dimensional spiral on the surface of a unit cylinder. The slope or inclination of the spiral depends on the signal period determined at step 602: the smaller the period, the smaller the slope, as the amount of time required to complete one full cycle is smaller and therefore the spiral movement in the z direction is smaller. For each point on the spiral shaped time-domain, the corresponding signal amplitude is represented as a radial distance from the cylinder surface, leading to a point inside, on, or outside the cylinder, depending on whether the amplitude is negative, zero or positive. The set of these points defines a second curve with varying radius, corresponding to a non-Cartesian graphical representation of the signal over the embedded time-domain. Consequently, amplitude values at times separated by the length of a period, originally arranged in a 'serial' manner in the input signal, are now arranged in a 'parallel' manner along the longitudinal direction of the cylinder, as they have the same value of phase and hence θ. This arrangement facilitates direct comparison of amplitude values at successive times corresponding to the same phase within respective cycles, even where those cycles have different periods.

By interpolating/extrapolating the amplitude values given on the embedded time axis to the entire phase-time domain, an extended map is defined on a cylindrical surface segment referred to herein as a 'waveshape map'. Its name is derived from the fact that for fixed h, it represents the shape of the waveform for the length of a cycle. Commonly known waveshapes include the sine, saw tooth, triangle, pulse or square wave. Considering a graph of the waveshape map over the cylinder (hence a non-Cartesian domain), i.e., the set of points with a (signed) distance to their radial projection on the cylinder surface corresponding to the waveshape map value, a three-dimensional surface is obtained, providing a three-dimensional representation of the signal waveshape in dependence of time. This surface can be viewed as the resulting generally cylindrical surface, or can be 'cut' and unfolded for display as a generally rectangular region with topographic (height) features, allowing the entire waveshape map to be displayed simultaneously; i.e., without needing to rotate the 'cylinder'.

Alternatively, a discontinuous three-dimensional representation can be generated by separating the time-domain of the signal 220 into portions or segments of length equal to the period and, after rescaling them to a length of $2\pi$, embedding them into a two-dimensional rectangular region, in a manner analogous to a raster scan. These segments in the (typically vertical) 'phase' direction are arranged in a 'parallel' manner along the (typically horizontal) axis thus created and corresponding to the cycle number, also referred to herein as normalized time. The rectangular region thus defined is also referred to herein as a phase-time domain. In an analogous way to the first method of time embedding, a three dimensional representation of the waveshape map is obtained by applying the amplitude values as a third dimension to the entire two-dimensional Cartesian phase-time domain.

The embedding process is also used to process non-quasi-periodic sections of the signal. For times t with no defined value of the period function 603, the period is set to zero. Consequently, the length of the corresponding cycle containing t is zero, and the time t is therefore the only value contained in the cycle. This, however, can be interpreted as t covering all phase values of the cycle simultaneously. In view of this, the time-embedding is defined as a multi-valued map on non-quasi-periodic sections of the signal, mapping the time t to the entire interval $[0, 2\pi]$.

The mappings of the signal 220 described above are achieved as follows. At step 606, the signal processor 104 generates time-embedding parameters 607 defining a parameterization s of a two-dimensional surface in three-dimensional space. Considering the nature of phase, this parameterisation s defines a topologically coherent phase-time domain $S = \{s(\phi, h) \mid \phi \in R, h \in [0,1]\}$. The parameters 607 define a parameterization $\gamma(t)$ from $[t_0, t_L]$ to S, referred to herein as 'embedding' of the signal time-domain $[t_0, t_L]$ into the two-dimensional phase-time domain S. For the purpose of the following description, it shall be assumed that $t_0 = 0$ and $t_L = \bar{t}$, where $\bar{t}$ is the end time of the signal. This embedding $\gamma$ is determined from the period function and is applied to the time-domain of signal 220, defining a curve $\Gamma \subset S$ corresponding to the embedded time-domain; i.e., $$\Gamma = \{\gamma(t) \mid t \in [0, \bar{t}]\}.$$

For example, FIG. 17C shows the embedded time-domain $\Gamma$ 1703 (green line) generated from the period function 1702 shown in FIG. 17B.

The parameterization $\gamma(t)$ is of the form $$\gamma(t) = s(\phi(t), h(t))$$

where $\phi(t)$ is a 'phase function' giving the phase at time t, and $h(t)$ is a parameterization of the 'normalized time' h, given by:

$$h(t) = t/\bar{t}.$$

The exact phase function is a solution $\phi_E(t)$ (if existing) of the equation $$\phi(t + T(t)) - \phi(t) = 2\pi, \text{ with } \phi(0) = 0$$

on each quasi-periodic or periodic portion of the signal, where $T(t)$ denotes the period function 603. However, in the interests of computational efficiency, the signal processing system approximates the exact phase function by a stepwise linear function connecting the points $(T_n, \phi(T_n))$, where:

$$T_0 = 0, T_{n+1} = T_n + T(T_n), \text{ and } \phi(T_n) = n \cdot 2\pi.$$

For time values t with no period length defined, the output of the phase function $\phi$ is the entire interval $[0, 2\pi]$. The default parameterization of s is as follows:

$$s(\phi, h) = (\cos(\phi), \sin(\phi), h) \quad (1)$$

However, the following alternative parameterizations can be used:

$$s(\phi, h) = (\phi \bmod 2\pi, h, 0) \quad (2)$$

$$s(\phi, h) = (\phi \bmod 2\pi, [\phi/2\pi]/[\phi(\bar{t})/2\pi], 0) \quad (3)$$

where the square brackets denote the Gaussian bracket, i.e., the function returning the largest integer less than or equal to the argument.

At step 608, the time embedding parameters 607 generated at step 606 are used to transform the signal 220 to generate a signal 609 defined on the curve $\Gamma$ in the phase-time domain. That is, the parameterization $\gamma$ is used to transform the signal $a(t)$ onto the curve $\Gamma$.

That is, for each point $z \in \Gamma$, the 'waveshape map' A on the curve $\Gamma$ is defined by $$A(z) = a(\gamma^{-1}(z)).$$

The map A defined on $\Gamma$ can be visualized via its graph i.e., the set of points having a (signed) distance from $\Gamma$ which is equal to the corresponding value of A, measured orthogonally from the phase-time domain S. For example, FIG. 17C shows the first few cycles of the graph 1704 of the waveshape map A(Γ) on Γ 1703 generated by applying the time embedding based on Equation (1) to the input signal. In addition, FIG. 17D depicts a graph 1705 of the first few cycles generated by using Equation (3), instead.

By means of a two-dimensional interpolation and extrapolation of the values of the waveshape map A on Γ, the waveshape map A 611 then is extended to the entire phase-time domain S at step 610. For example, FIG. 17E shows a graph of the waveshape map A(S) 1707 on the entire domain S 1706, generated by extrapolating and interpolating the waveshape map A(Γ) 1704 of FIG. 17C over S. The analogous extension of S for the case of Equation (3) is shown as 1708 in FIG. 17F.

It may be noted that the function t→A(γ(t)) corresponds to the original signal a(t) for all t ∈ [0, t̄]. Consequently, the original signal can be obtained from the period function T(t) uniquely defining φ(t), the parameter s (defining γ(t)) together with the waveshape map A.

At step 604, the waveshape map A 611 is stored in the data model 400. Returning to FIG. 5, following the import signal process 504, at step 518 of the signal process, a test is performed to determine whether a new or modified image needs to be displayed on the GUI 114. If so, then the image is rendered at step 520, and the process then returns to wait for the next instruction at step 500.

The GUI 114 provides an image display panel for displaying the image of the waveshape map generated by the system as a colour bitmap image. A graph of the period function (if any) over a section of the time-axis is displayed adjacent to the waveshape map image. The GUI 114 also provides a parameter editor for editing parameters of the data model 400.

The image rendered on the VDU 402 shows the graph of the waveshape map generated at step 610. The result is a two-dimensional coloured image representing the input signal 220. The displayed waveshape map allows a user to obtain a visual overview of the waveform information of the entire signal at once and to readily evaluate slow changes in qualitative features of the input signal, in particular the waveshape.

Figure 9:
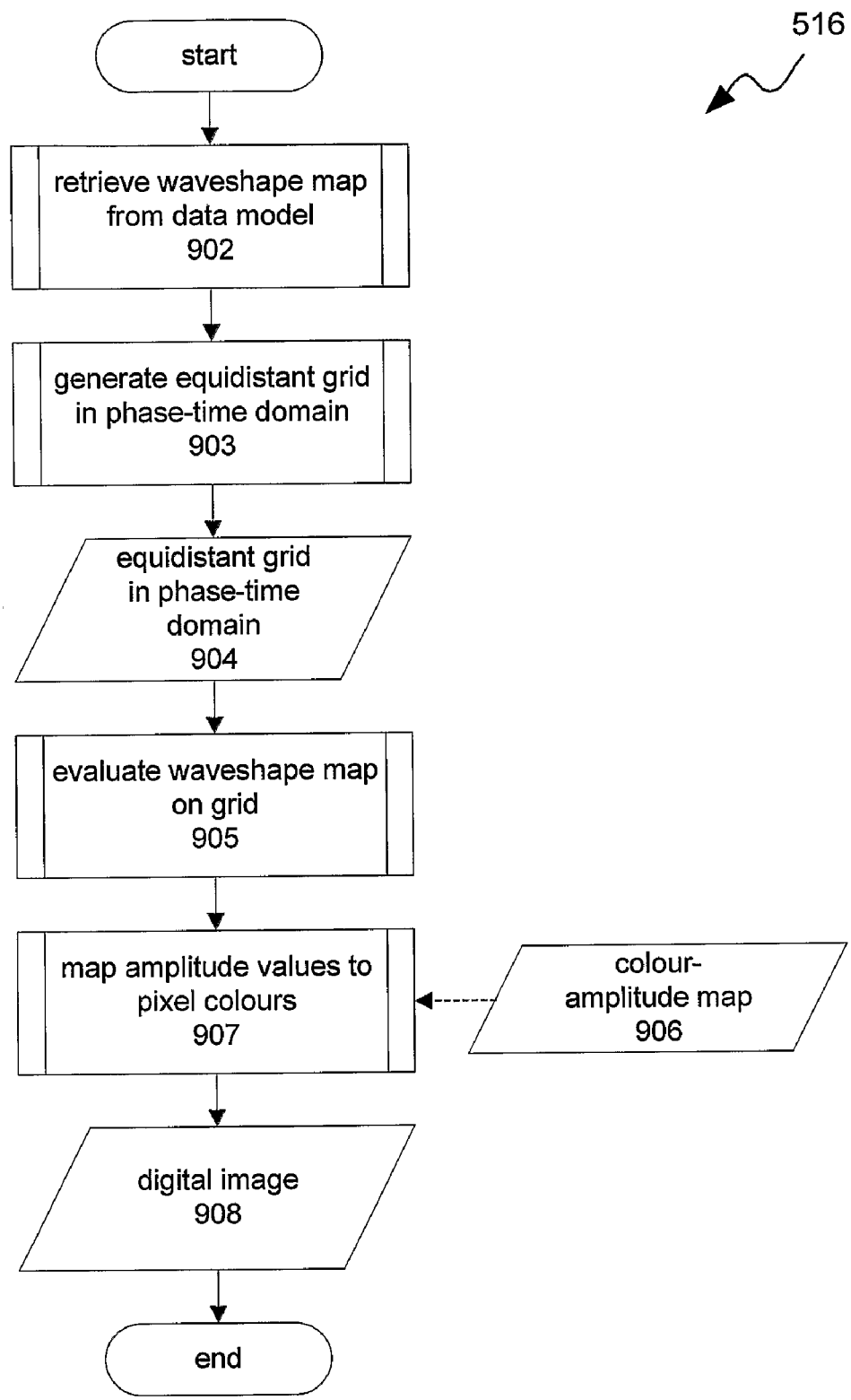
FIG. 9 is a flow diagram of an image export process of the signal process.

Returning to FIG. 5, an image of a waveshape map generated by the signal processing system can be exported by executing an export image process 516, as shown in FIG. 9. First, the waveshape map corresponding to the image is retrieved from the data model instance 400, at step 902, together with values describing the desired resolution (i.e., M times N pixels with 8, 16, 24 or higher bit colour depth) of the digital image to be exported. At step 903, an equidistant grid $\{(\phi_m, h_n) | m=0, \ldots, M, n=0, \ldots N\}$ in the interval $[0, 2\pi] \times [0, 1]$ of the Cartesian plane is defined in a way such that the numbers of horizontal and vertical grid points correspond to the resolution of the digital image to be exported.

By means of the parameterization s described above, the grid $(\phi_m, h_n)$ is transformed onto the phase-time domain S, delivering an equidistant grid 904 in the phase-time domain where the grid resolution corresponds to the image resolution. At step 905, the waveshape map is evaluated on the grid 904 to provide a set of amplitude values $A_{m,n} = A(s(\phi_m, h_n))$.

Depending on the export colour depth specified in the parameters, a colour-amplitude map 906 (also referred to as a colour-map or colour-coding) is retrieved from the parameters. At step 907, the inverse of this colour-amplitude map is applied to the amplitude values $A_{m,n}$, producing a set of indexed pixel colours representing the exported digital image 908, which is sent to the output adapter 106.

Figure 18:
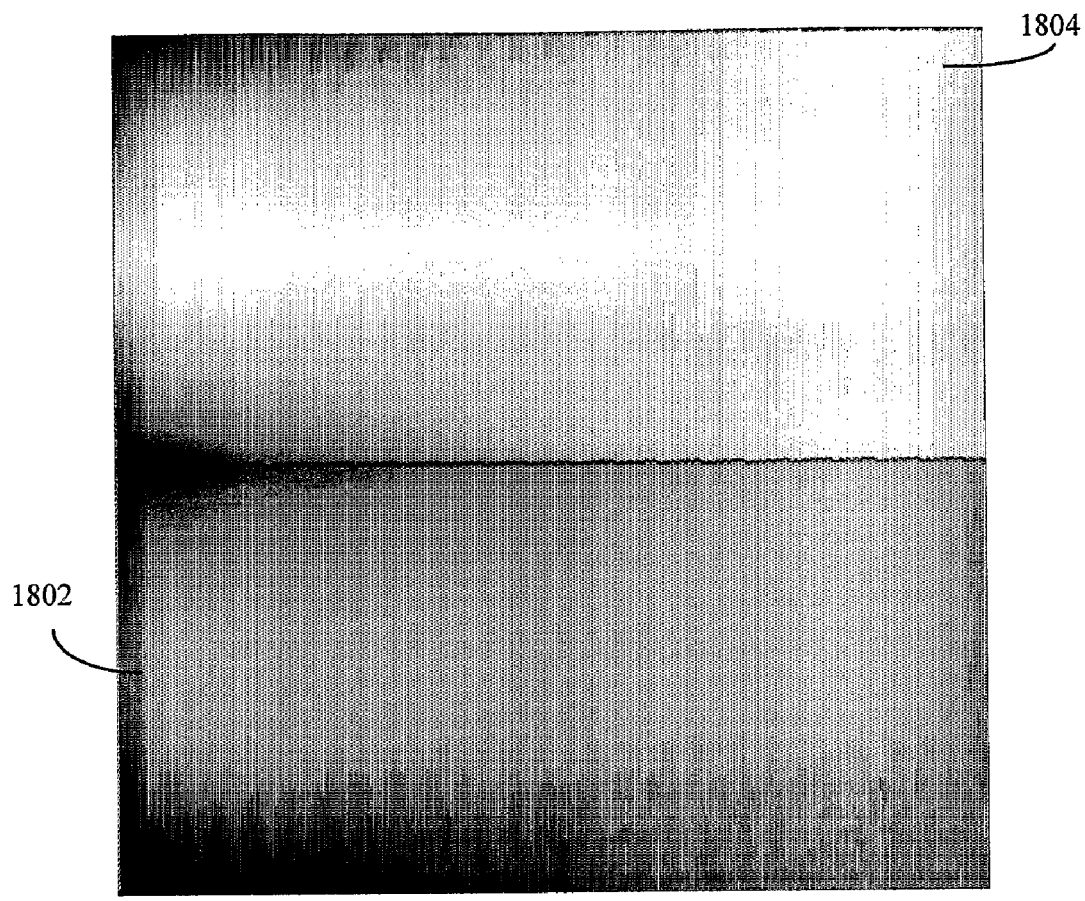
FIG. 18 is an image of a waveshape map generated by the system and representing a signal transition from a triangular waveform to a square waveform.

For example, FIG. 18 is an image of a waveshape map for an input signal whose waveform changes from a triangular to a square wave. In this example, the colour green has been associated with positive amplitude values (represented in a lower portion 1802 of the image), and a pink colour represents negative amplitude values (corresponding to the upper portion 1804 of the image). The intensity of each colour represents the magnitude of the amplitude. It may be observed that at the left-hand side of the image, the amplitude increases from zero (indicated by the colour black) to a maximum intensity at a phase corresponding to one-quarter of the cycle, and decreases symmetrically back to zero at a half the cycle. Similarly, in the negative amplitude portion 1804, the amplitude begins at zero, increases to a maximum (negative) amplitude at three-quarters of the cycle, and then decreases symmetrically back to zero at the end of the cycle. Thus although the exact shape of the waveform over the first few cycles cannot be determined exactly by casual inspection of this visualisation, it is readily apparent that the waveshape at this time is something resembling a triangular or sinusoidal waveshape. Conversely, the waveshape represented at the right-hand side of the image gives rise to a green and pink colours of constant intensity in the first portion 1802 and second portion 1804, respectively. Thus it is immediately apparent to an observer that this represents a square waveshape, assuming the colour mapping is known. Looking at the image as a whole, it is therefore apparent that the initially triangular (or similar) waveshape represented at the left of the image gradually becomes a square waveshape over the number of cycles represented.

Figure 19:
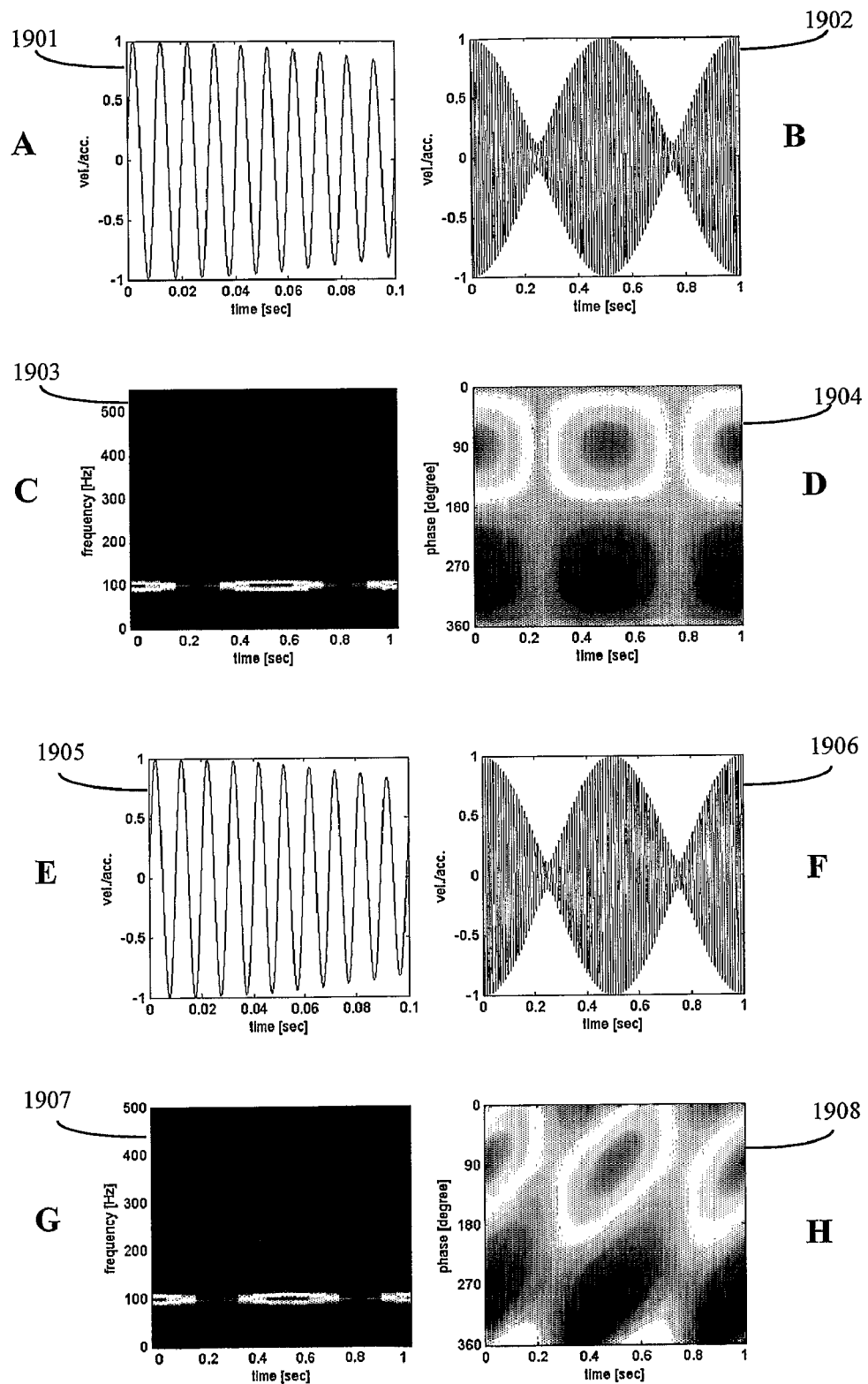
FIGS. 19A and 19B are graphs of a first signal.
FIG. 19C is a spectrogram of the first signal.
FIG. 19D is a waveshape map of the first signal.
FIGS. 19E and 19F are graphs of a second signal.
FIG. 19G is a spectrogram of the second signal.
FIG. 19H is a waveshape map of the second signal.

For comparison, FIGS. 19A to 19H show visualizations of two similar signals. The waveforms are shown in a "zoomed" views 1901, 1905 in FIGS. 19A and 19E, and "global" views 1902, 1906 in FIGS. 19B and 19F, but no difference is evident. The corresponding spectrograms 1903, 1907 in FIGS. 19C and 19G show no difference either. However, the graphs of the waveshape map 1904 and 1908 in FIGS. 19D and 19H clearly show that the signals are in fact different. The colour coding in this case assigns red to positive values, blue to negative values, and green to values small in amplitude. With this it can be readily seen that both signals feature a sinusoidal-like waveshape which flattens twice as the signal evolves. The positive (yellow/red) and negative (light/dark blue) regions represent the growing and disappearing positive and negative peaks of the sinusoidal waveshape. It is readily apparent that the phase of these peaks does vary slowly over time in the second signal 1908. This difference between such an "amplitude modulated" signal 1904 and a "beating" signal 1908 may be important in vibration analysis.

Figure 20:
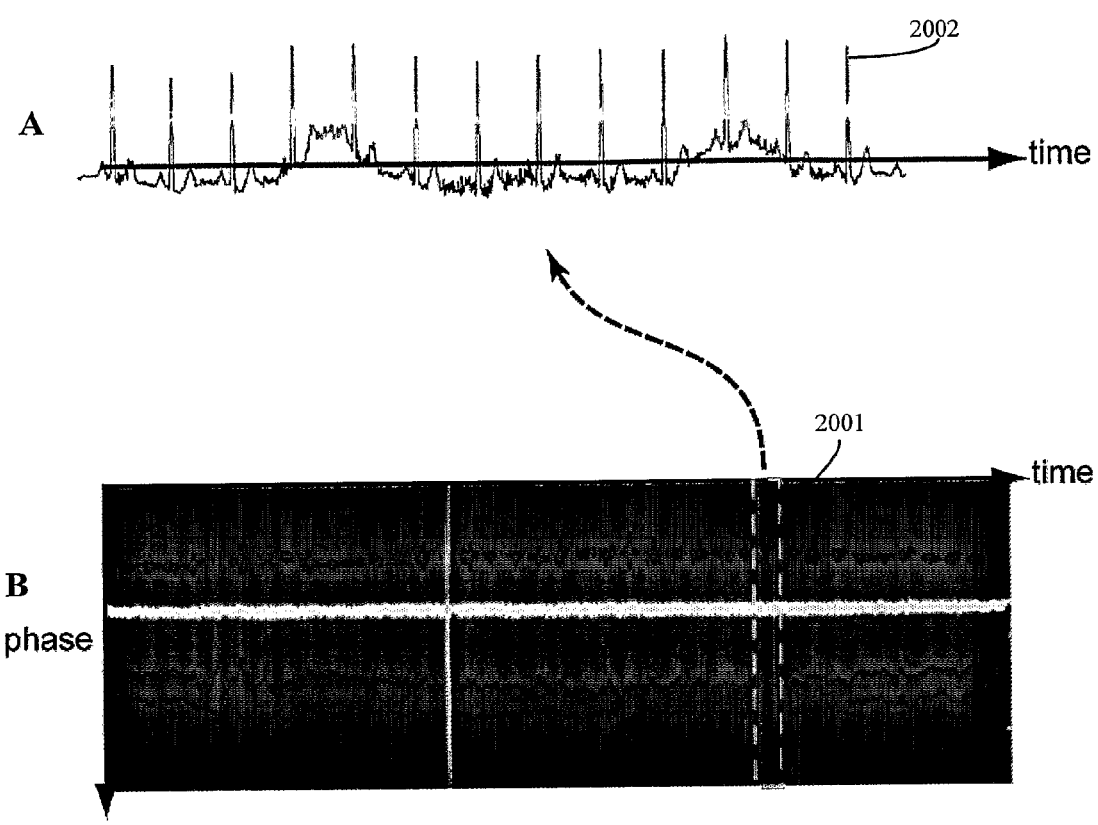
FIGS. 20A and 20B illustrate the selection of a portion of a waveshape map showing a feature of interest in order to generate a waveform of the selected portion, in the case of a recording of an electrocardiograph.

FIG. 20B is an image of a waveshape map generated from a 10 minute recording of an electrocardiograph. Such a waveshape map can be used as a navigational tool to detect regions of interest and then, by selecting these regions 2001 in the waveshape map, to view the corresponding section of the waveform 2002 for further diagnosis, as shown in FIG. 20A. FIG. 20A shows 10 seconds of ECG waveform 2002. Note that, due to the compact re-arrangement of the time domain, an electrocardiogram of approximately 10 minutes duration can be represented in a single image without loss of resolution. For example, an image of 1500×500 pixels horizontal resolution can represent a 6 hour ECG with 15 second resolution in the horizontal direction and two millisecond resolution in the vertical direction. This is important in the evaluation of long-term ECG changes.

FIG. 16E shows an image 1609 of the wave shape map generated from the voice recording described above.

If desired, the system can generate and display values derived from the waveshape map data, including derivatives $d/d\phi\, A(\phi, h)$ and $d/dh\, A(\phi, h)$. Additionally, the derived values can be the difference between the amplitude at a given first point $z_1 \in S$, and the amplitude at a second point $z_2(z_1)$ defined by $z_1$ and parameters. As a first example, defining $(\phi_1, h_1) := s^{-1}(z_1)$, the point $z_2$ can be defined as $z_2 := s(\phi_1, 0)$ such that the resulting differences show the 'total evolution of the waveshape over time', away from the initial waveshape. In a second example, the point $z_2$ can be defined as $z_2 := s(\phi_1, h_1 + \delta)$ for a small fixed $\delta$. An appropriate choice for $\delta$ would be the distance on Z corresponding to the distance of two pixel rows in the resulting image. In this case, the values displayed can be interpreted as the 'variation' of the waveshape over time.

Figure 3:
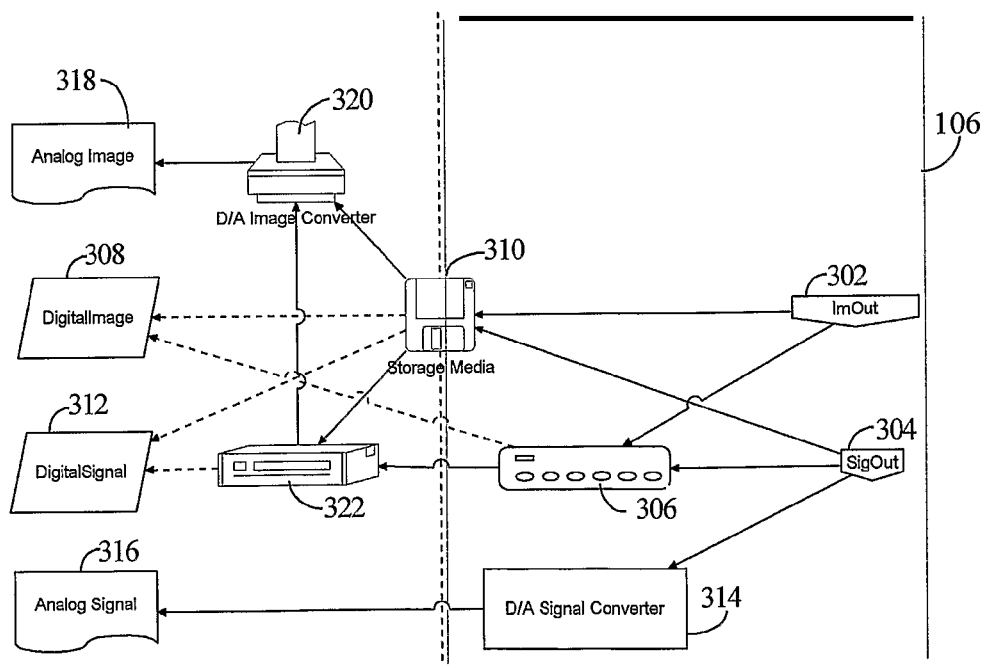
FIG. 3 is a schematic diagram illustrating data flows of an output module of the system.

As shown in FIG. 3, the output adapter 106 includes output ports 306, comprising USB, S/PDIF, serial and parallel ports, removable storage media 310, including floppy disk, CD-RW, DVD-RW, and magnetic tape devices, and a digital-to-analogue converter (DAC) 314, which can be provided on a digital I/O card, or a sound card or device.

The output image 302 can be sent as a data stream through output ports 306, or stored on storage media 310. An output image stored on storage media 310 can be used to generate an analog output image 318, using a device such as a printer or facsimile machine 320. An output signal 304 can also be sent via the output ports 306 to an external device 322 capable of receiving a digital data stream, which may be, for example, another instance of the signal processing system. Alternatively, the output signal can be converted using the DAC 314 to provide an analog output signal 316.

In an alternative embodiment, the output adapter 106 includes a RAM buffer in order to store one or more digital signals and images resulting from the processing in the signal processor 104 before and while sending it to any receiving external devices 322 or generating an analog signal. This allows the sending of real-time streams of digital images or signals.

Figure 21:
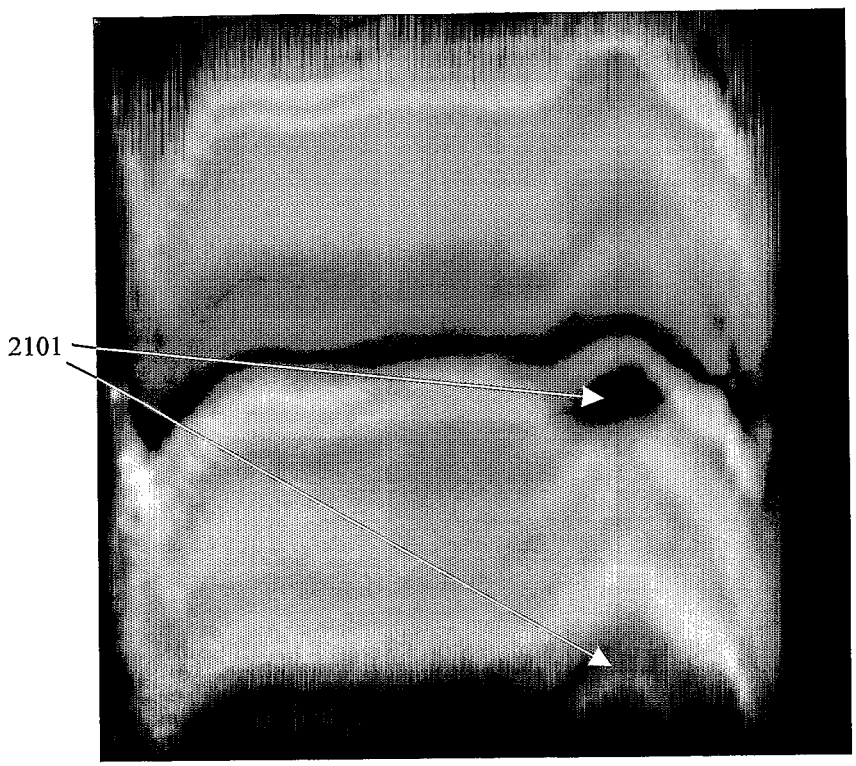
FIG. 21 is an image of a waveshape map generated by the system and representing the sound made by a didgeridoo.
Figure 22:
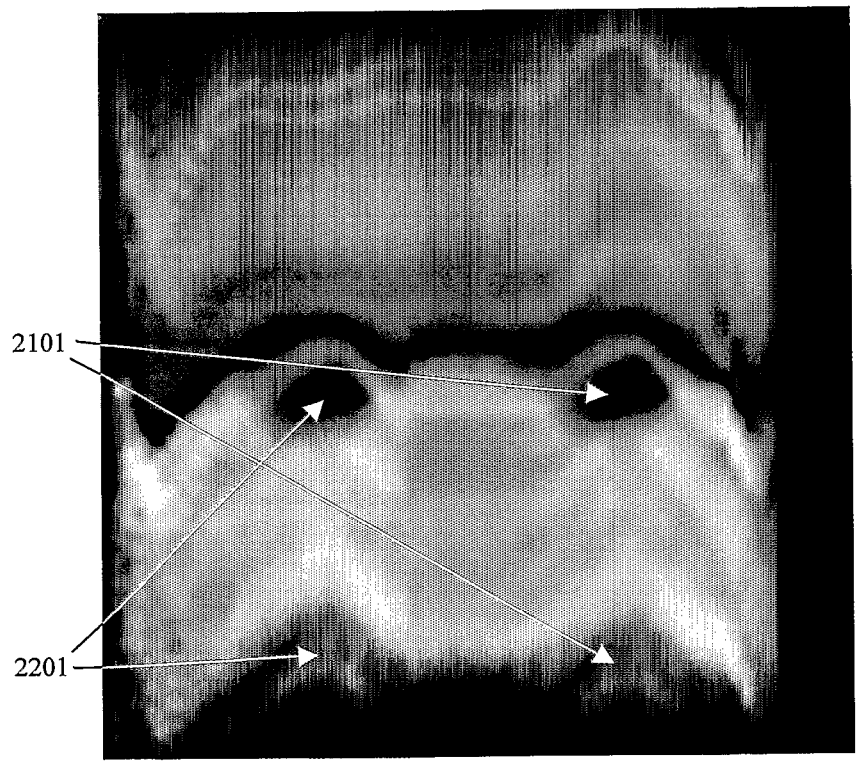
FIG. 22 is an image of a waveshape map generated by the system by modifying the image of FIG. 21.

Once a waveshape map has been generated, it can be modified in the corresponding model instance 400 at step 510. The waveshape map can be modified in a number of ways, including manipulation of its visual representation using the GUI 114. For example, FIG. 21 is an image of a waveshape map generated from a sound sample of a didgeridoo. A modified image can be generated from this image, using image manipulation tools. For example, FIG. 22 shows a modified version of the image shown in FIG. 21, whereby a 'modulation feature' 2101 in the original image has been copied to a new location 2201 in the modified image. The signal processing system also provides the following methods for modifying the data model 400 and waveshape map directly:

(i) Implicit definition of the modified waveshape map by means of a formula F describing the modification in text form, allowing the reference to A as a map.

For simplicity, A is regarded as a map on the Cartesian phase-time domain such that F depends on $\phi$, h, allowing expressions such as "$F(\phi, h) = A(\phi, h) - A(\phi, h+0.01)$".

(ii) Merge the existing waveshape map A in the data model 400 with a second waveshape map B obtained by importing a second signal or image and storing the corresponding second instance of the data model temporarily. The merging is performed by weighted phase-time dependent addition, subtraction, multiplication or other combinations of the values of A and B on each point $z \in S$.

(iii) A process as described above in (ii), where the weights of the merging map are defined by pixel values of a third digital image.

(iv) Modifications based on a transformation $\Phi$ of the phase-time domain. Although this can be achieved via a corresponding expression in the method described above in (i), the expression required may be undesirably complex. Hence a grid displayed on the display device of the GUI can be manipulated to define the image points $\Phi((x,y)_{m,n})$ of the transformation applied to the original grid $(x,y)_{m,n}$.

The transformation $\Phi$ then is obtained by interpolation and the modified waveshape map B replacing A is defined via $B(z) = A(\Phi^{-1}(z))$.

(v) Modifying values of A visually, e.g., by increasing and decreasing the values in a neighbourhood of a selected point. Using GUI interaction, for the duration of the click of a mouse button and/or applying finger pressure on a pressure sensitive touch pad, the amplitude values can be repeatedly changed by a certain percentage. The choice of the percentage (less or greater than 100%) determines whether the amplitude values increase or decrease.

(vi) Modification of the waveshape map via change of colour-amplitude map. The data model 400 is exported to a temporarily stored digital image in RAM 112, using a first colour-amplitude map. Using a second colour-amplitude map, this digital image then is reimported from RAM 112. Consequently, entire sections of the amplitude range of the original modulation-map are reassigned according to the differences between the colour-amplitude maps used for temporary export and import.

Analogous processes can be used to modify the period function T(t) 603 of the data model 400.

Alternatively, rather than modifying the waveshape map via manipulating its visualization on a colour graphic image display on the GUI 114, the waveshape map can be edited via a 3D model of its graph using a 3D model editing system. Such a system may provide a touch sensitive screen rendering a projected view of the graph and allowing it to be re-positioned and altered in three-dimensional space. Alternatively, the signal processing system could be interfaced to a virtual reality system, allowing the manipulation of the 3D model directly.

Figure 8:
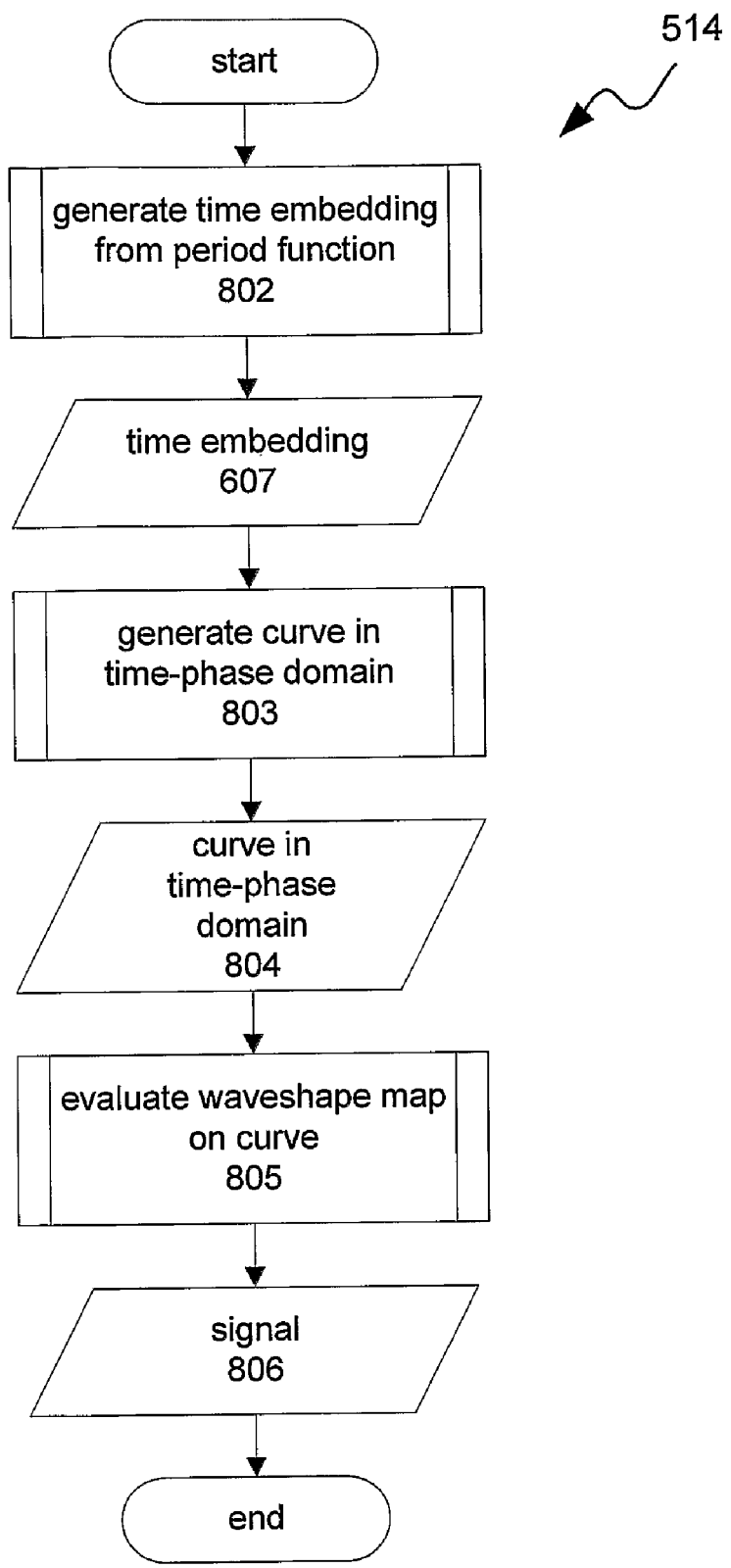
FIG. 8 is a flow diagram of a signal export process of the signal process.

Once modified, the data model 400 can be used to generate an output signal for export, using an export signal process 514, as shown in FIG. 8. The signal export process 514 is essentially the reverse of the signal import process 504. Given the data model 400 containing the period function T(t) defined on $[0, \bar{t}]$, and the waveshape map A(z) defined on S, at step 802 the time embedding $\gamma(t)$ 607 is determined from the period function stored in the CEH 116.

At step 803, a curve 804 $\Gamma$ in the phase-time domain is generated on the basis of the time embedding 607. Setting $a(t) = A(\gamma(t))$ for $t \in [0, \bar{t}]$, at step 805, the waveshape map is evaluated along the points of the curve $\Gamma$, yielding a signal a(t) 806. The resulting signal 806 is then sent to the output adapter 106 for export.

In an alternative embodiment, the user can modify the functions $\phi(t)$, $h(t) = t/\bar{t}$ used at step 802 of the signal export step 514. This changes the time embedding and thus the curve $\Gamma$ in S on which the waveshape map is evaluated at step 805. Modifying $\phi(t)$ changes the set of phase values for which A is determined as the time t of the exported signal evolves. Replacing the preferred parameterisation $\phi(t)$ with $\phi_{new}(t) = \phi(2*t)$ for instance, results in an exported signal with half the original period (thus double the frequency). Setting $\phi_{new}(t) = \phi(t(1+\delta \sin(\omega t)))$ with small $\delta$ adds a vibrato to the signal. In the case of audio signals, modifying $\phi(t)$ can therefore be used to produce effects such as 'pitch bending' or 'pitch removal'.

Modifying h(t) changes the range and order of h values for which A is evaluated. Since for each fixed h, the map $\phi \to A(\phi, h)$ describes the waveshape at a certain time, modifying h(t) corresponds to a change in the selection range and order of waveshapes comprising the exported signal. For example, in the case illustrated in FIG. 10, replacing the parameterisation with $h_{new}(t)=h(\bar{t}-t)$ results in an exported signal whose length and period are identical to the original signal, but whose waveform changes from a square wave to a triangular wave, rather than vice-versa. Note that this is not equivalent to the original signal being time-reversed but corresponds to a 'reversal of timbre evolution', instead. Time reversal is achieved by setting $\phi_{new}(t)=\phi(\bar{t}-t)$ and $h_{new}(t)=h(\bar{t}-t)$. It will be apparent to those skilled in the art that a wide variety of alternative mappings or parameterisations can be devised to modify the model such that the set of amplitudes of the exported signal are identical to the amplitudes of the input signal, but having a different sequential order. Applied to audio signals, modifying h(t) may be used for 'time stretching' or 'wavetable re-synthesis'. To those skilled in the art of audio synthesis, the signal export process 514 may be considered to be a form of wave terrain synthesis, where the terrain corresponds to the graph of the waveshape map defined over time and phase, and the orbit corresponds to the curve 804, uniquely defined by the period function.

Figure 7:
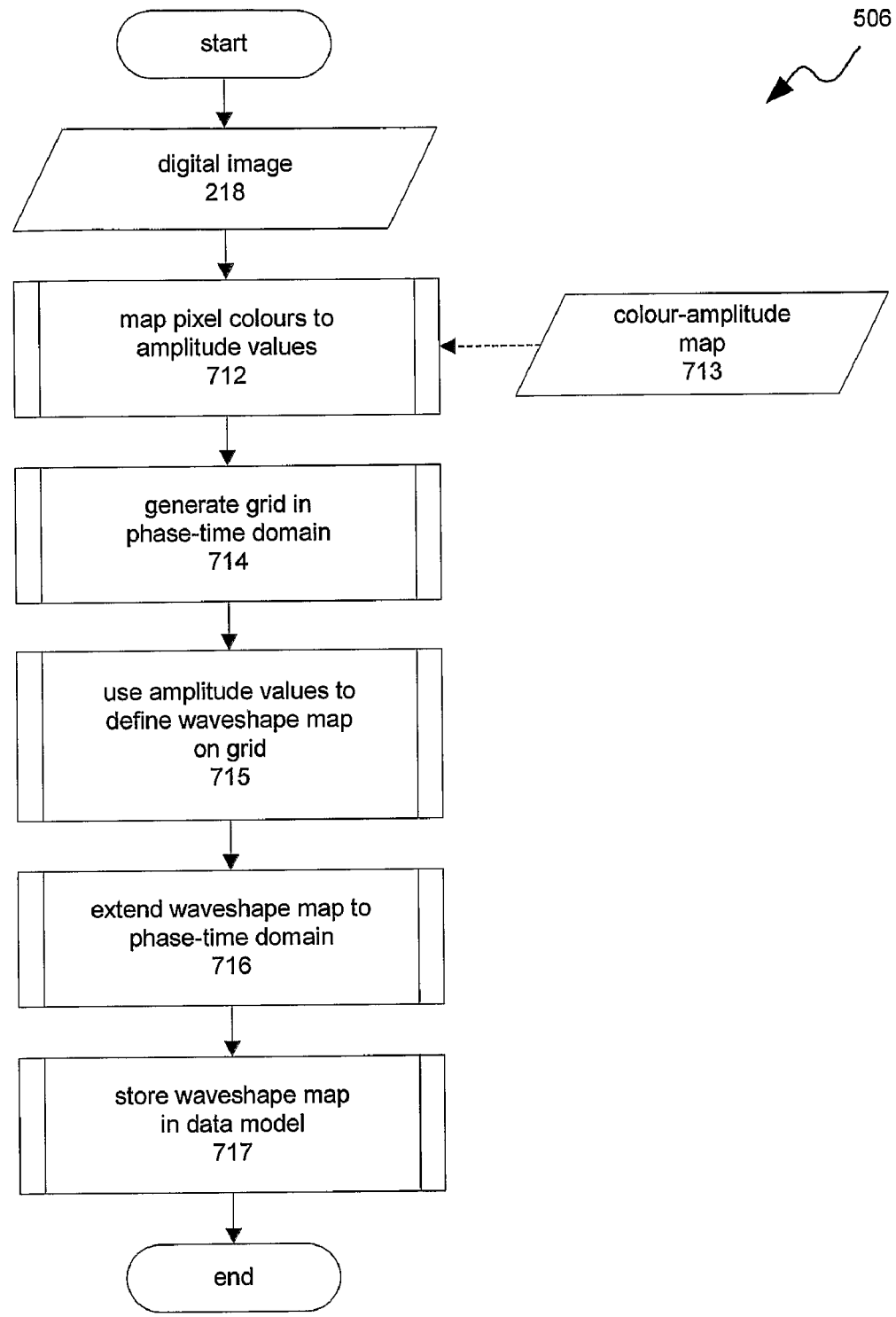
FIG. 7 is a flow diagram of an image import process of the signal process.

As an alternative to generating an image from a waveshape map generated from an input signal, the signal processing system can import an existing digital image 218 by executing an image import process 506, as shown in FIG. 7. The imported digital image 218 can subsequently be used to generate an output signal, using the export signal process 514 described above, where amplitudes of the output signal are generated on the basis of the intensities and/or colours of the imported image. The imported digital image can of course be modified as described above prior to export.

Import of a digital image 218 relies on the interpretation of colour (and/or intensity) values of the image pixels as signal amplitude values. This is achieved by mapping pixel colour values to amplitude values at step 712, using a colour-amplitude map 713. However, the range of colour values found in the digital image depends on the colour depth of the digital image. It is therefore desirable to apply a colour-amplitude map with an appropriate colour depth. The system includes several colour-amplitude maps stored in the parameters, allowing the import of digital images of 8, 16, and 24-bit colour depth.

At step 712, the colour-amplitude map 713 is retrieved from the data model 400 and used to process the colour values of the image pixels to generate a set of amplitude values $\{a_{m,n}|m=0,\ldots,M, n=0,\ldots N\}$, where the numbers M and N correspond to the numbers of pixels in a first and second direction of the image. At step 714, the numbers M and N are used to define a uniform grid in the phase-time domain, by applying the transformation s described above to a uniform mesh or grid $\{(\phi_m,h_n)|m=0,\ldots,M, n=0,\ldots N\}$ covering the interval $[0,2\pi]\times[0,1]$ in the Cartesian plane. At step 715, values of a waveshape map A defined on the transformed grid $\{s(\phi_m,h_n)|m=0,\ldots,M, n=0,\ldots N\}$ are defined from the amplitude values, i.e., $A(s(\phi_m,h_n))=a_{m,n}$. By means of two-dimensional interpolation and extrapolation, the domain of the waveshape map A then is extended to the entire phase-time domain S at step 716 and stored in the data model 400 at step 717. As the image contains no information relating to a time domain or period function in a natural way, the period function possibly stored in the data model 400 is not modified. This completes the image import process 506.

In addition to creating a data model 400 and corresponding image by importing a signal or existing image, the signal processing system can alternatively generate the data model 400 internally, and the data model 400 can then be used to generate a signal or image for export. A data model 400 can be automatically generated in many ways. Methods requiring more complex parameters but providing a large amount of control on the outcome are more likely to be of scientific use, whereas automated methods with a small set of parameters are more user-friendly and thus may be preferred for entertainment applications (e.g., for the creation of previously unheard sounds in audio signal synthesis). The signal processing system provides the following methods for generating a data model:

(i) Explicit definition of the waveshape map by means of a formula entered in text form. For simplicity, this formula represents the waveshape map transformed back to the Cartesian plane, i.e., depending on (φ,h).

(ii) Processes creating digital images temporarily stored in memory, which then are automatically imported into the data model. This covers deterministic or non-deterministic mathematical processes as found in the fields of dynamical systems theory (fractals, iterated function systems, phase portraits) or stochastics (self-organization). Seed values for random processes could be obtained via user interaction, e.g., key input sequences or mouse movements.

(iii) Creation of the data model 400 as described above for the image import step, where the digital image is modified in an additional step prior to the import. In order to gain a signal with equal amounts of positive and negative amplitude, for instance, the dynamic range of the signal is adjusted or the original image is extended on one side with a negative copy of itself. The term 'negative' refers to the colour-amplitude map, i.e., the pixel values in the attached copy of the digital image would be replaced with values corresponding to the negative of the original amplitude.

(iv) Definition of the waveshape map via some or all of its values. More precisely, given a map B defined in Cartesian coordinates, the waveshape map is defined by $A(z)=B(s^{-1}(z))$ for all appropriate z∈S. Using interpolation and extrapolation, the map A then is extended to all of S. As an example, B could represent a collection of data values in an entirely different context, such as empirical or statistical data obtained in science and engineering.

Obviously, analogous processes can be used to create period functions of the data model. In particular the creation via the visual representation of the graph, allowing the user to select a point on the graph and dragging it in order to change the shape of the entire graph in a neighbourhood, and hence the period function, is encompassed.

Figure 23:
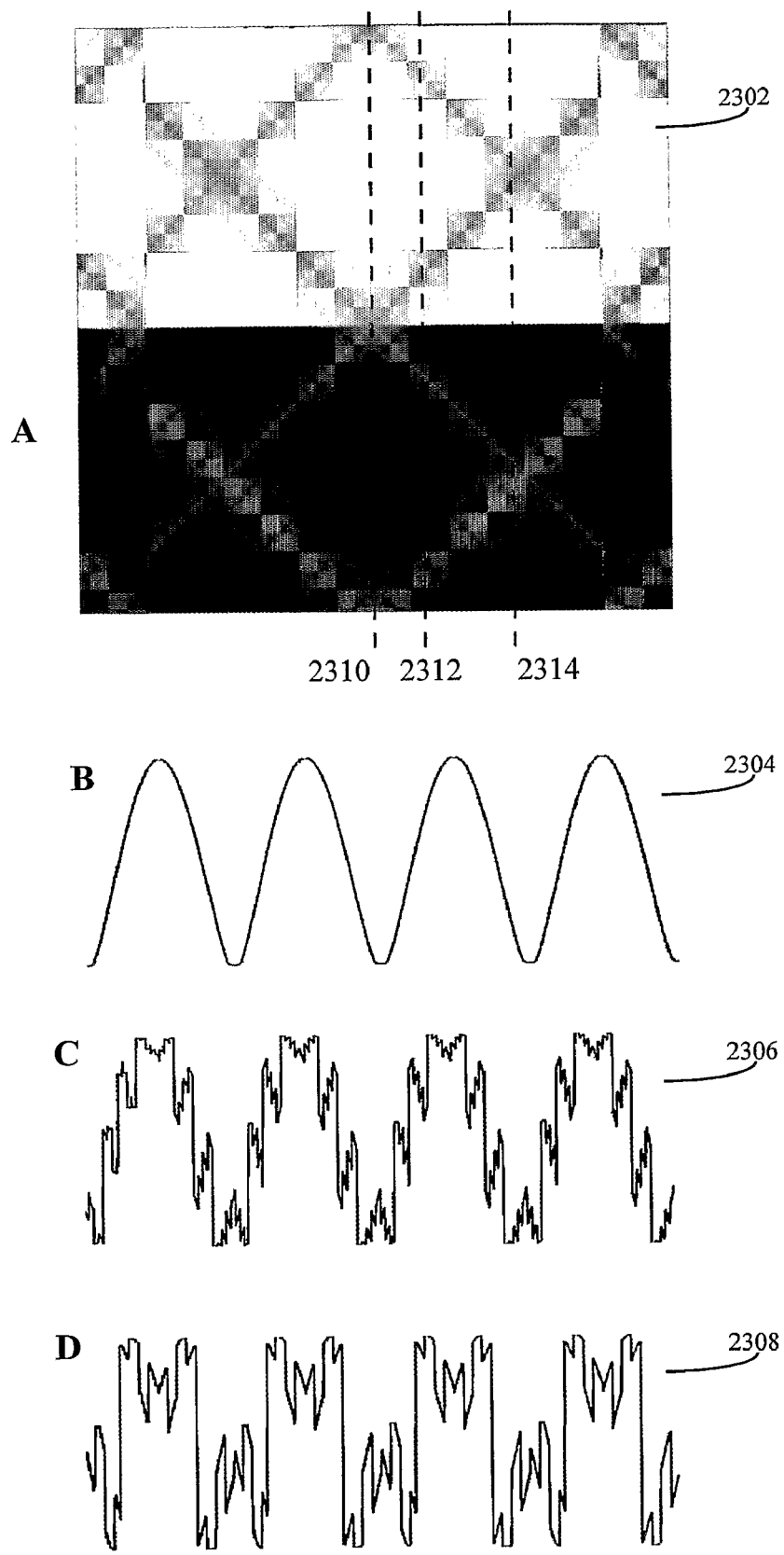
FIG. 23A is an image imported into the system.
FIGS. 23B to 23D are images of three segments of a signal generated from a waveshape map corresponding to the imported image of FIG. 23A, corresponding to respective.

FIG. 23A shows a 'fractal' waveshape map 2302 generated mathematically. To illustrate the nature of waveshapes occurring in an exported signal generated from this digital image, FIGS. 23B to 23D show portions 2304, 2306, 2308 of the waveform corresponding to the respective times 2310, 2312, and 2314 shown in FIG. 23A.

In the described embodiment, the creation processes are hard-coded. In an alternative embodiment, the user can install one or more plug-in modules to allow the processes for generating and/or modifying a data model 400 to be customised to the user's requirements.

As described above, in contrast to prior art methods and systems, the signal processing system preserves amplitude data but applies a transformation of the time domain instead. Images generated from the transformed data can be readily comprehended by a human observer, and in particular reveal amplitude changes at fixed phase in an intuitive manner. This greatly facilitates a number of signal processing tasks.

When applied to audio signals, the system can split a monophonic sound into time-dependent pitch information (derived from the period function) and a waveshape map revealing amplitude and waveshape changes independently over time. Thus the parameters most relevant for sound synthesis, being pitch, volume and timbre of the sound, are readily visualised and can therefore be controlled independently.

A typical use of the signal processing system is as follows:
(i) import an existing signal or image or alternatively create a model instance. An image of the resulting period function and waveshape map is automatically displayed to the user on the VDU 402;
(ii) change the system parameters 512 to select a modification method and parameters thereof, if required;
(iii) initiate the modification process for the current data model instance 400. The displayed image is automatically updated to display the modified period function and/or waveshape map;
(iv) revise the result of the previous modification by considering the new image;
(v) if required, export the data model 400 to a signal and revise the signal instead to decide on the result obtained by the modification;
(vi) repeat steps 2 to 5 as required to finally achieve the desired result; and
(vii) export the data model 400 to a final output signal or image.

In an alternative embodiment, the system includes an abstract programming interface for automated control and allowing automated processing for repetitive or time consuming tasks.

In yet a further alternative embodiment adapted for sound synthesis, the input adapter 102 includes a MIDI interface for sending instructions to the CEH 116. These instructions initiate playback of signals by providing musical note data defining pitch as well as parameters for the modification of the waveshape map, creating a digital audio signal. Moreover, the output adapter 106 includes an additional data buffer. In a repeated manner, the CEH 116 initiates the creation of a signal segment applying a creation step, possibly followed by the one or more subsequent modification steps. Both creation and modification are using the parameters as stored in RAM at time of processing, allowing the real-time manipulation of the synthesis. Upon termination of the creation and modification step(s), the CEH 116 initiates the export signal process 514 to export the signal via the output adapter 106 and refresh the image in the GUI 114. Considering the processing time required by the signal processor 104, the CEH 116 chooses a suitable 'repetition rate' or 'update frequency' and buffer size to avoid interruption of the output stream.

In yet a further alternative embodiment, a signal processing system receives period data indicating the periods or cycles of a signal represented by signal data, and the system processes the period data and the signal data to generate a normalised representation of the signal. In this embodiment, the system does not need to process the signal data to determine the cycles or periods, since these are effectively provided to the system.

It will be apparent those skilled in the art that although the signal process and system have been described above in terms of processing signal data representing a signal, the signal process and system can more generally be applied to determine cycles in any form of data, and are not limited to data representing a signal. As described above, the cycles thus determined are not limited to temporal cycles with respect to time, but can be cycles with respect to any variable (as represented by variable data) on which the relevant values depend.

Many modifications will be apparent to those skilled in the art without departing from the scope of the present invention as herein described with reference to the accompanying drawings.

The invention claimed is:

1. A non-transitory computer-readable storage medium that stores instructions that when executed by a computer processor, cause the computer processor to process a signal which represents a physical phenomenon, by:
applying an average magnitude difference function to successive portions of a signal having cycles of different lengths to generate correlation data representing differences between successive portions of said signal for each of a plurality of different portion lengths;
processing the correlation data to determine said lengths of said cycles;
generating, on the basis of the determined lengths, normalization data for normalizing said cycles to a common length; and
generating cycle data representing alignment of a plurality of normalized cycles of said signal, wherein a first dimension of said cycle data represents successive normalized cycles of said signal or normalized time of said normalized cycles, a second dimension of said cycle data represents phase of said normalized cycles, and a third dimension of said cycle data represents amplitudes of said normalized cycles.

2. The non-transitory computer-readable storage medium of claim 1, wherein said first dimension of said cycle data represents normalized time of said normalized cycles.

3. The non-transitory computer-readable storage medium of claim 1, wherein the instructions, when executed by the computer processor, further cause the computer processor to perform generating image data representing a visual representation of said cycle data.

4. The non-transitory computer-readable storage medium of claim 3, wherein said visual representation represents alignment of normalized cycles of said signal in a cylindrical coordinate system.

5. The non-transitory computer-readable storage medium of claim 4, wherein a radial coordinate of said cylindrical coordinate system represents amplitudes of said normalized cycles, a height coordinate of said cylindrical coordinate system represents normalized time of said normalized cycles, and an angular coordinate of said cylindrical coordinate system represents phase of said normalized cycles.

6. The non-transitory computer-readable storage medium of claim 1, wherein the instructions, when executed by the computer processor, further cause the computer processor to perform generating image data representing a two-dimensional visual representation of said cycle data, the two dimensions of said visual representation including a first dimension representing successive normalized cycles of said signal, and a second dimension representing a phase of said normalized cycles, amplitudes of said normalized cycles being represented by corresponding intensities and/or colors.

7. The non-transitory computer-readable storage medium of claim 2, wherein the instructions, when executed by the computer processor, further cause the computer processor to perform generating image data representing a two-dimensional visual representation of said cycle data, the two dimensions of said visual representation including a first dimension representing normalized time of said signal, and a second dimension representing a phase of said normalized cycles, amplitudes of said normalized cycles being represented by corresponding intensities and/or colors.

8. The non-transitory computer-readable storage medium of claim 3, wherein said visual representation represents alignment of at least corresponding portions of normalized cycles of said signal.

9. The non-transitory computer-readable storage medium of claim 3, wherein said image data includes color data representing colors and/or intensities assigned to amplitudes of said signal.

10. The non-transitory computer-readable storage medium of claim 3, wherein the instructions, when executed by the computer processor, further cause the computer processor to perform generating user interface data for displaying a graphical user interface to a user, said graphical user interface including one or more interactive controls for use in modifying a displayed image generated from said image data.

11. The non-transitory computer-readable storage medium of claim 10, wherein said graphical user interface includes one or more interactive controls for allowing a user to generating an output signal data from a displayed image.

12. The non-transitory computer-readable storage medium of claim 3, wherein the instructions, when executed by the computer processor, further cause the computer processor to perform receiving selection data representing a selected region of a displayed image generated from said image data; and processing said selection data to generate second image data representing a portion of said signal corresponding to the selected region.

13. The non-transitory computer-readable storage medium of claim 1, wherein the instructions, when executed by the computer processor, further cause the computer processor to perform:
  modifying said cycle data; and
  generating an output signal on the basis of the modified cycle data.

14. The non-transitory computer-readable storage medium of claim 13, wherein the generating the output signal includes:
  generating normalized output data on the basis of the modified cycle data; and
  denormalizing the normalized output data on the basis of said normalization data to provide said output data.

15. The non-transitory computer-readable storage medium of claim 13, wherein the modifying said cycle data includes modifying said cycle data such that amplitudes of said output signal correspond to amplitudes of said signal, the sequential order of said amplitudes of said output signal being different to the sequential order of amplitudes of said signal.

16. The non-transitory computer-readable storage medium of claim 13, wherein the modifying is based on a mapping function determined by a user.

17. The non-transitory computer-readable storage medium of claim 13, wherein the modifying said cycle data includes applying one or more selected functions to said cycle data to determine amplitudes of said output signal.

18. The non-transitory computer-readable storage medium of claim 1, wherein the instructions, when executed by the computer processor, further cause the computer processor to perform generating cycle length data representing lengths of respective cycles of said signal.

19. The non-transitory computer-readable storage medium of claim 1, wherein the applying the average magnitude difference function includes applying said average magnitude difference function in a manner for use with signals having significant base line variation.

20. The non-transitory computer-readable storage medium of claim 1, wherein said average magnitude difference function is of the form:

$$D(i,j) = \frac{\sum_{k=0}^{j-1} |(a_{i-j+k} - m_{i-j,j}) - (a_{i+k} - m_{i,j})|}{\sum_{k=0}^{j-1} |a_{i-j+k} - m_{i-j,j}| + \sum_{k=0}^{j-1} |a_{i+k} - m_{i,j}|}$$

where $$m_{i,j} = \frac{1}{j}\sum_{k=0}^{j-1} a_{i+k},$$

i is an index representing position of a corresponding signal portion, j is an index representing length of the signal portion, and $a_l$ represents an $l^{th}$ amplitude of said signal, such that D(i,j) provides a normalized measure of difference between successive signal portions.

21. The non-transitory computer-readable storage medium of claim 1, wherein the processing the correlation data to determine said lengths of said cycles includes determining said lengths of said cycles by selecting one or more minima of said correlation data, said minima being determined using a recursive, multi-resolution process.

22. The non-transitory computer-readable storage medium of claim 1, wherein the instructions, when executed by the computer processor, further cause the computer processor to perform:
  generating image data representing a visual representation of said cycle data as a plurality of aligned cycles of said signal, a first dimension of said image data substantially representing successive cycles of said signal, and a second dimension of said image data representing a phase of said cycles, amplitudes of said signal being represented by colors and/or intensities assigned to said amplitudes;
  modifying said image data; and
  generating an output signal on the basis of the modified image data.

23. The non-transitory computer-readable storage medium of claim 22, wherein the instructions, when executed by the computer processor, further cause the computer processor to perform generating a graphical user interface for displaying an image generated from said image data, said graphical user interface including one or more interactive controls for allowing a user to modify the displayed image.

24. The non-transitory computer-readable storage medium of claim 23, wherein the instructions, when executed by the computer processor, further cause the computer processor to perform receiving from said interface selection data representing a selected portion of said signal, and displaying a region of said image corresponding to the selected portion of said signal.

25. The non-transitory computer-readable storage medium of claim 22, wherein the instructions, when executed by the computer processor, further cause the computer processor to perform receiving selection data representing a selected region of a displayed image generated from said image data; and processing said selection data to generate second image data representing a portion of said signal corresponding to the selected region.

26. The non-transitory computer-readable storage medium of claim 1, wherein said cycles of said signal are cyclic with respect to time.

27. The non-transitory computer-readable storage medium of claim 3, wherein the instructions, when executed by the computer processor, further cause the computer processor to perform:
processing said image data to generate an output signal on the basis of the image data, said output signal including a sequence of signal amplitudes, each of said signal amplitudes corresponding to an intensity and/or color of a corresponding location within said visual image, each amplitude being positioned within said sequence based on its location in said visual image.

28. The non-transitory computer-readable storage medium of claim 27, wherein each location of said visual image determines a cycle and a phase of said output signal.

29. The non-transitory computer-readable storage medium of claim 28, wherein each location corresponds to two coordinate values, a first of said coordinate values determining a phase for the corresponding signal amplitude, and a second of said coordinate values determining a cycle for the corresponding signal amplitude.

30. The non-transitory computer-readable storage medium of claim 3, wherein the instructions, when executed by the computer processor, further cause the computer processor to display the image.

31. A non-transitory computer-readable storage medium that stores instructions that when executed by a computer processor, cause the computer processor to process a signal which represents a physical phenomenon, by:
processing signal data representing a signal having cycles of different lengths to generate correlation data representing correlations of successive portions of said signal for a plurality of portion lengths;
determining said lengths of said cycles by selecting one or more minima of said correlation data, wherein said one or more minima of said correlation data are determined using a recursive, multi-resolution process;
generating, on the basis of the determined lengths, normalization data for normalizing said cycles to a common length; and
generating cycle data representing alignment of a plurality of normalized cycles of said signal, wherein a first dimension of said cycle data represents successive normalized cycles of said signal or normalized time of said normalized cycles, a second dimension of said cycle data represents phase of said normalized cycles, and a third dimension of said cycle data represents amplitudes of said normalized cycles.

32. The non-transitory computer-readable storage medium of claim 31, wherein the instructions, when executed by the computer processor, further cause the computer processor to group together minima corresponding to integer multiples of signal portion length.

33. A computer-implemented method of operating a signal processing system, the method comprising:
applying, by at least one computer processor of the signal processing system, an average magnitude difference function to successive portions of a signal having cycles of different lengths to generate correlation data representing differences between successive portions of said signal for each of a plurality of different portion lengths;
processing, by the at least one computer processor of the signal processing system, the correlation data to determine said lengths of said cycles;
generating, by the at least one computer processor of the signal processing system, on the basis of the determined lengths, normalization data for normalizing said cycles to a common length; and
generating, by the at least one computer processor of the signal processing system, cycle data representing alignment of a plurality of normalized cycles of said signal, wherein a first dimension of said cycle data represents successive normalized cycles of said signal or normalized time of said normalized cycles, a second dimension of said cycle data represents phase of said normalized cycles, and a third dimension of said cycle data represents amplitudes of said normalized cycles.

34. The method of claim 33, wherein said first dimension of said cycle data represents normalized time of said normalized cycles.

35. The method of claim 33, further comprising generating, by the at least one computer processor of the signal processing system, image data representing a visual representation of said cycle data.

36. The method of claim 35, wherein said visual representation represents alignment of normalized cycles of said signal in a cylindrical coordinate system.

37. A signal processing system, including:
at least one processor of the signal processing system;
at least one processor-readable memory of the signal processing system that stores instructions executable by the at least one processor to cause the at least one processor to:
apply an average magnitude difference function to successive portions of a signal having cycles of different lengths to generate correlation data representing differences between successive portions of said signal for each of a plurality of different portion lengths;
process the correlation data to determine said lengths of said cycles;
generate, on the basis of the determined lengths, normalization data for normalizing said cycles to a common length;
generate cycle data representing alignment of a plurality of normalized cycles of said signal, wherein a first dimension of said cycle data represents successive normalized cycles of said signal or normalized time of said normalized cycles, a second dimension of said cycle data represents phase of said normalized cycles, and a third dimension of said cycle data represents amplitudes of said normalized cycles; and
generate image data representing alignment of the plurality of normalized cycles of said signal.

38. The system of claim 37 wherein the instructions are further executable by the at least one processor to cause the at least one processor to modify said image data to generate output data representing a modification of said signal.

39. The system of claim 38, wherein the instructions are further executable by the at least one processor to cause the at least one processor to:
generate normalized output data on the basis of the modified image data; and
denormalize the normalized output data on the basis of said normalization data to provide said output data.

40. The signal processing system of claim 37, wherein the instructions are further executable by the at least one processor to cause the at least one processor to:
generate image data representing the signal as a two-dimensional graphical image, amplitudes of said signal being represented by corresponding intensities and/or colors;
modify said image data; and
generate an output signal on the basis of the modified image data.

41. A computer-implemented method of operating a signal processing system, the method comprising:
processing, by at least one computer processor of the signal processing system, signal data representing a signal having cycles of different lengths to generate correlation data representing correlations of successive portions of said signal for a plurality of portion lengths;

determining, by the at least one computer processor of the signal processing system, said lengths of said cycles by selecting one or more minima of said correlation data, wherein said one or more minima of said correlation data are determined using a recursive, multi-resolution process;

generating, by the at least one computer processor of the signal processing system, on the basis of the determined lengths, normalization data for normalizing said cycles to a common length; and generating, by the at least one computer processor of the signal processing system, cycle data representing alignment of a plurality of normalized cycles of said signal, wherein a first dimension of said cycle data represents successive normalized cycles of said signal or normalized time of said normalized cycles, a second dimension of said cycle data represents phase of said normalized cycles, and a third dimension of said cycle data represents amplitudes of said normalized cycles.

42. The method of claim 41 further comprising grouping together, by the at least one computer processor of the signal processing system, minima corresponding to integer multiples of signal portion length.

43. The method of claim 41, further comprising generating, by the at least one computer processor of the signal processing system, image data representing a visual representation of said cycle data.

* * * * *